US012587692B2

(12) United States Patent
Bhattacharyya et al.

(10) Patent No.: US 12,587,692 B2
(45) Date of Patent: Mar. 24, 2026

(54) METHODS AND SYSTEMS TO SYNERGIZE CONTEXT OF END-USER WITH QUALITY-OF-EXPERIENCE OF LIVE VIDEO FEED

(71) Applicant: Tata Consultancy Services Limited, Mumbai (IN)

(72) Inventors: Abhijan Bhattacharyya, Kolkata (IN); Madhurima Ganguly, Bangalore (IN); Ashis Sau, Kolkata (IN); Suraj Kumar Mahato, Kolkata (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 0 days.

(21) Appl. No.: 19/057,381

(22) Filed: Feb. 19, 2025

(65) Prior Publication Data

US 2025/0267311 A1      Aug. 21, 2025

(30) Foreign Application Priority Data

Feb. 21, 2024     (IN) .............................. 202421012395

(51) Int. Cl.
H04N 21/2187       (2011.01)
G06F 3/01       (2006.01)
(52) U.S. Cl.
CPC ......... H04N 21/2187 (2013.01); G06F 3/013 (2013.01)
(58) Field of Classification Search
None
See application file for complete search history.

(56) References Cited

U.S. PATENT DOCUMENTS 9,530,450 B2     12/2016  Laksono et al.
10,712,817 B1 *   7/2020  Rönngren .......... G02B 27/0093
(Continued)

OTHER PUBLICATIONS

Bipul Mohanto et al.;"An integrative view of foveated rendering", Computers & Graphics, Elsevier, vol. 102, pp. 474-501, (2022).
(Continued)

*Primary Examiner* — Junior O Mendoza
(74) *Attorney, Agent, or Firm* — Finnegan, Henderson, Farabow, Garrett & Dunner, LLP

(57)       ABSTRACT

The disclosure relates generally to methods and systems to synergize context of end-user with quality-of-experience (QoE) of live video feed. Conventional techniques mostly lack synergy between encoder/decoder and underlying protocol, and they mostly employ motion vector-based encoding, thereby making them not so suitable for latency critical application. In most of the telepresence/teleoperation based live video streaming applications, at a time user's attention is focused on certain region of streamed video and not the entire frame. But most of existing techniques under challenges network conditions, undermine quality evenly throughout frame without giving importance to end-user's instantaneous region of interest. Existing mechanisms that try to alleviate this problem using foveated rendering are computationally expensive hence cannot be deployed easily on real life robotics platforms. The present disclosure attempts to alleviate all above challenges through end-user foveation centric spatio-temporal bitrate adaptation scheme tightly entangled with underlying protocol to achieve dynamic foveated rendering.

12 Claims, 22 Drawing Sheets

(56) References Cited

U.S. PATENT DOCUMENTS

2022/0334635 A1*  10/2022  Hawkins ........ H04N 21/234363
2025/0272815 A1*   8/2025  Namiki ................... G06F 3/013

OTHER PUBLICATIONS

Pietro Lungaro et al.; "Gaze-Aware Streaming Solutions for the
Next Generation of Mobile VR Experiences", IEEE Transactions on
Visualization and Computer Graphics, Research Gate, vol. 24, issue
4, 11 pages, (2018).
Oliver Wiedemann et al.; "Foveated Video Coding for Real-Time
Streaming Applications", Twelfth International Conference on Qual-
ity of Multimedia Experience (QoMEX)., IEEE, 6 pages, (2020).
Y. T. Tefera et al.; "FoReCast: Real-time Foveated Rendering and
Unicasting for Immersive Remote Telepresence", International Con-
ference on Artificial Reality and Telexistence, Eurographics Sym-
posium on Virtual Environments, Eurographics Proceedings, the
Eurographics Association pp. 75-84, (2022).

* cited by examiner

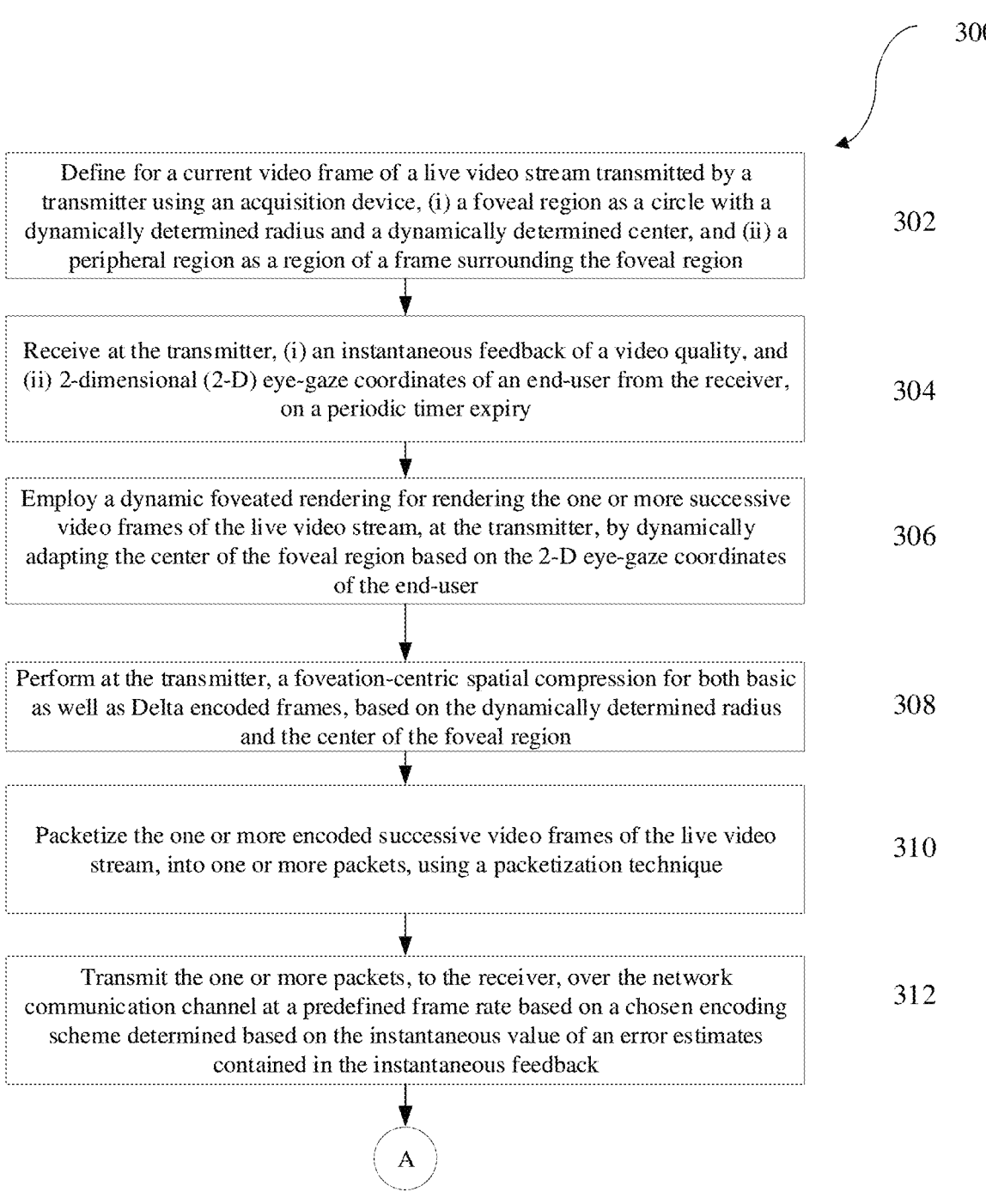

300

Define for a current video frame of a live video stream transmitted by a transmitter using an acquisition device, (i) a foveal region as a circle with a dynamically determined radius and a dynamically determined center, and (ii) a peripheral region as a region of a frame surrounding the foveal region

302

Receive at the transmitter, (i) an instantaneous feedback of a video quality, and (ii) 2-dimensional (2-D) eye-gaze coordinates of an end-user from the receiver, on a periodic timer expiry

304

Employ a dynamic foveated rendering for rendering the one or more successive video frames of the live video stream, at the transmitter, by dynamically adapting the center of the foveal region based on the 2-D eye-gaze coordinates of the end-user

306

Perform at the transmitter, a foveation-centric spatial compression for both basic as well as Delta encoded frames, based on the dynamically determined radius and the center of the foveal region

308

Packetize the one or more encoded successive video frames of the live video stream, into one or more packets, using a packetization technique

310

Transmit the one or more packets, to the receiver, over the network communication channel at a predefined frame rate based on a chosen encoding scheme determined based on the instantaneous value of an error estimates contained in the instantaneous feedback

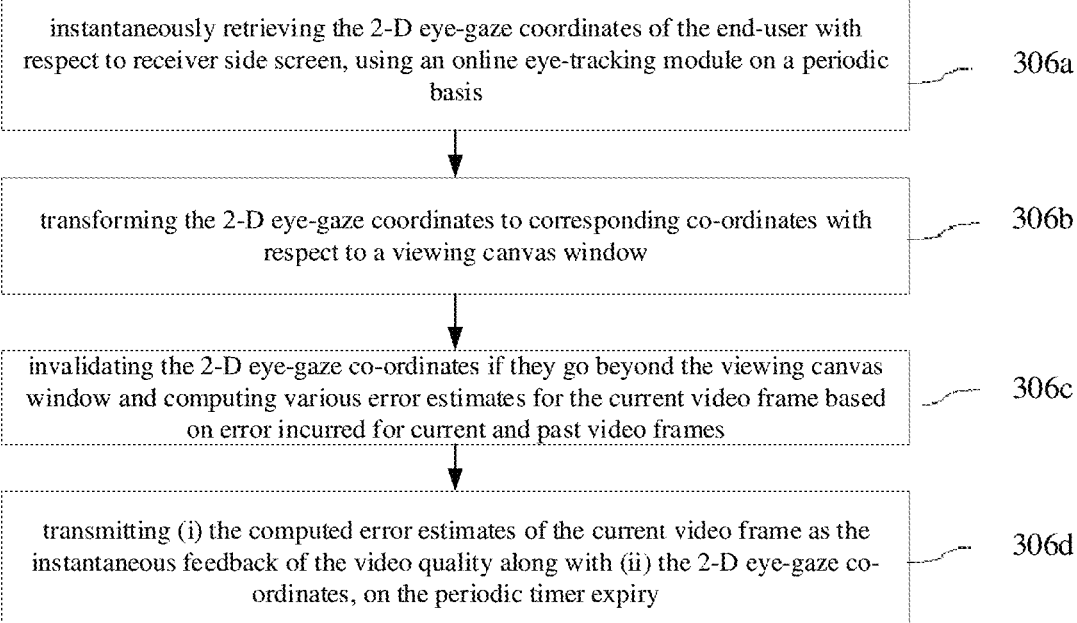

instantaneously retrieving the 2-D eye-gaze coordinates of the end-user with respect to receiver side screen, using an online eye-tracking module on a periodic basis　　306a transforming the 2-D eye-gaze coordinates to corresponding co-ordinates with respect to a viewing canvas window　　306b invalidating the 2-D eye-gaze co-ordinates if they go beyond the viewing canvas window and computing various error estimates for the current video frame based on error incurred for current and past video frames　　306c transmitting (i) the computed error estimates of the current video frame as the instantaneous feedback of the video quality along with (ii) the 2-D eye-gaze co-ordinates, on the periodic timer expiry　　306d

FIG. 6

Average
Latency (ms)

METHODS AND SYSTEMS TO SYNERGIZE CONTEXT OF END-USER WITH QUALITY-OF-EXPERIENCE OF LIVE VIDEO FEED

PRIORITY CLAIM

This U.S. patent application claims priority under 35 U.S.C. § 119 to: Indian Patent Application number 202421012395, filed on Feb. 21, 2024. The entire contents of the aforementioned application are incorporated herein by reference.

TECHNICAL FIELD

The disclosure herein generally relates to tele-robotics, and, more particularly, to methods and systems to synergize context of end-user with quality-of-experience of live video feed.

BACKGROUND

Quality-of-experience (QoE)-centric streaming of visual feedback is a key factor for Internet-facing delay-sensitive interactive applications such as mobile telerobotics. The sanity of such visual feeds is extremely important for meaningful command execution by the operator to a remote robot. Conventional techniques for live video streaming for real time applications lack synergy between encoding and underlying protocol. Additionally, they employ a motion vector induced group of pictures (GoP) based encoding that severely degrades the quality evenly throughout the frame under challenged network conditions. Also, GoP based encoding scheme is not suitable for latency critical applications. It is observed that at a time, the end-user's attention is limited to a specific region of interest in the current frame. This region of interest keeps shifting dynamically based on scene changes and user context. Therefore, to improve end-user experience, there have been some works in the domain of foveated rendering in the context of VR applications. They mimic the human visual system to render frames with high quality in foveal (region of interest) region and comparatively lower quality in peripheral regions. This helps reduce overall bitrate of the encoded video and allocate encoding resources judiciously. But they have not been applied in concerned real-time delay-sensitive physical Applications. Also, they use additional sensors in the headgear to track head movement and gaze and cannot be democratized for general consoles. Also, most of the foveated rendering techniques attempt at improving quality of foveal region by encoding the foveal region at higher resolution than the peripheral regions. But such methods usually make the system computationally expensive and hence are not easily deployable on real life robotic platforms.

SUMMARY

Embodiments of the present disclosure present technological improvements as solutions to one or more of the above-mentioned technical problems recognized by the inventors in conventional systems.

In an aspect, a processor-implemented method to synergize context of end-user with quality-of-experience of live video feed is provided. The method including the steps of: defining for a current video frame of a live video stream transmitted by a transmitter using an acquisition device, (i)

a foveal region as a circle with a dynamically determined radius and a dynamically determined center, and (ii) a peripheral region as a region of a frame surrounding the foveal region; receiving at the transmitter, (i) an instantaneous feedback of a video quality, and (ii) 2-dimensional (2-D) eye-gaze coordinates of an end-user from the receiver, on a periodic timer expiry; employing a dynamic foveated rendering for rendering the one or more successive video frames of the live video stream, at the transmitter, by dynamically adapting the center of the foveal region based on the 2-D eye-gaze coordinates of the end-user; performing at the transmitter, a foveation-centric spatial compression for both the current basic as well as Delta encoded frame, based on the dynamically determined radius and the center of the foveal region; packetizing the one or more encoded successive video frames of the live video stream, into one or more packets, using a packetization technique; transmitting the one or more packets, to the receiver, over the network communication channel at a predefined frame rate based on a chosen encoding scheme determined based on the instantaneous value of an error estimates contained in the instantaneous feedback; receiving the one or more packets, at the receiver; reconstructing the one or more frames from the one or more packets, using the payload specific header; and estimating an error rate of the current video frame, using the payload specific header and a number of packets received.

In another aspect, a system to synergize context of end-user with quality-of-experience of live video feed is provided. The system includes: a memory storing instructions; one or more input/output (I/O) interfaces; an acquisition device; and one or more hardware processors coupled to the memory via the one or more I/O interfaces, wherein the one or more hardware processors are configured by the instructions to: define for a current video frame of a live video stream transmitted by a transmitter using an acquisition device, (i) a foveal region as a circle with a dynamically determined radius and a dynamically determined center, and (ii) a peripheral region as a region of a frame surrounding the foveal region; receive at the transmitter, (i) an instantaneous feedback of a video quality, and (ii) 2-dimensional (2-D) eye-gaze coordinates of an end-user from the receiver, on a periodic timer expiry; employ a dynamic foveated rendering for rendering the one or more successive video frames of the live video stream, at the transmitter, by dynamically adapting the center of the foveal region based on the 2-D eye-gaze coordinates of the end-user; perform at the transmitter, a foveation-centric spatial compression for both basic as well as Delta encoded frames, based on the dynamically determined radius and the center of the foveal region; packetize the one or more encoded successive video frames of the live video stream, into one or more packets, using a packetization technique; transmit the one or more packets, to the receiver, over the network communication channel at a predefined frame rate based on a chosen encoding scheme determined based on the instantaneous value of an error estimates contained in the instantaneous feedback; receive the one or more packets, at the receiver; reconstruct the one or more frames from the one or more packets, using the payload specific header; and estimate an error rate of the current video frame, using the payload specific header and a number of packets received.

In yet another aspect, there are provided one or more non-transitory machine-readable information storage mediums comprising one or more instructions which when executed by one or more hardware processors cause: defining for a current video frame of a live video stream transmitted by a transmitter using an acquisition device, (i) a foveal region as a circle with a dynamically determined radius and a dynamically determined center, and (ii) a peripheral region as a region of a frame surrounding the foveal region; receiving at the transmitter, (i) an instantaneous feedback of a video quality, and (ii) 2-dimensional (2-D) eye-gaze coordinates of an end-user from the receiver, on a periodic timer expiry; employing a dynamic foveated rendering for rendering the one or more successive video frames of the live video stream, at the transmitter, by dynamically adapting the center of the foveal region based on the 2-D eye-gaze coordinates of the end-user; performing at the transmitter, a foveation-centric spatial compression for both basic as well as Delta encoded frames, based on the dynamically determined radius and the center of the foveal region; packetizing the one or more encoded successive video frames of the live video stream, into one or more packets, using a packetization technique; transmitting the one or more packets, to the receiver, over the network communication channel at a predefined frame rate based on a chosen encoding scheme determined based on the instantaneous value of an error estimates contained in the instantaneous feedback; receiving the one or more packets, at the receiver; reconstructing the one or more frames from the one or more packets, using the payload specific header; and estimating an error rate of the current video frame, using the payload specific header and a number of packets received.

In an embodiment, the dynamic foveated rendering is employed for rendering the one or more successive video frames of the live video stream, by: instantaneously retrieving the 2-D eye-gaze coordinates of the end-user with respect to entire receiver side screen, using an online eye-tracking module on a periodic basis; transforming the 2-D eye-gaze coordinates to corresponding co-ordinates with respect to a viewing canvas window; invalidating the 2-D eye-gaze co-ordinates if they go beyond the viewing canvas window and computing various error estimates for the current video frame based on error incurred for current and past video frames and transmitting (i) the computed error estimates of the current video frame as the instantaneous feedback of the video quality along with (ii) the 2-D eye-gaze co-ordinates, on the periodic timer expiry.

In an embodiment, the center is dynamically determined based on the 2-D eye gaze coordinates of the end-user at the receiver; and the radius is dynamically determined based on the instantaneous feedback of the video quality received on the periodic timer expiry from the receiver.

BRIEF DESCRIPTION OF THE DRAWINGS

The accompanying drawings, which are incorporated in and constitute a part of this disclosure, illustrate exemplary embodiments and, together with the description, serve to explain the disclosed principles:

FIGS. 3A through 3B illustrate exemplary flow diagrams of a processor-implemented method illustrating the protocol semantics, transmitter and receiver side operations to achieve dynamic foveated rendering, in accordance with some embodiments of the present disclosure.

FIG. 6 is an exemplary flow diagram showing steps illustrating how the instantaneous 2D end-user eye-gaze co-ordinates are retrieved from an online tracker and subsequent post processing of eye-gaze co-ordinates to achieve dynamic foveated rendering, in accordance with some embodiments of the present disclosure.

DETAILED DESCRIPTION

Figure 1:
FIG. 1 illustrates an exemplary application scenario for methods and systems of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments.

In a typical telerobotics application, a human operator remotely controls a mobile robot over the public Internet. The operator gets the live context of the remote environment through the live video feed from the robot camera to the operator console and sends control commands to the robot based on contextual inferences. The end-user quality-of-experience (QoE) of such visual feed, in turn, impacts the QoE of the entire control operation. It is very sensitive to poor visual quality, overshoot in end-to-end motion-to-photon or scene-to-screen delay and freezing. Such occurrences drastically reduce the confidence of the operator on the sanity of inferred remote context and adversely impacts the overall actuation decisions.

Additionally, it is observed that in real life telerobotics application, the attention of the end-user is focused on a portion of the scene and not the entire scene. This becomes the instantaneous region of interest of the end-user. This region of interest (foveal region) usually dynamically shifts throughout the frame based on scene changes and current user's attention. Therefore, transmitting video in real time without compromising with the quality of foveal region and while meeting the instantaneous channel QoS requirements becomes an essential requirement for successful working of any real-time telepresence/tele-operation systems.

In recent times, a foveated rendering is being tried in the context of virtual reality (VR) glass applications to enable bit-rate reduction aligned with user's observation. But those have not been applied in concerned real-time delay sensitive physical applications. Also, they use additional sensors in the headgear to track head movement and gaze and cannot be democratized for general consoles.

The present disclosure attempts to solve the above discussed challenges in state of art techniques. The key contributions of the methods and systems of the present disclosure are:

Spatiotemporal encoding and QoE-centric bit-rate adaptation: A human-foveation centric spatial bitrate adaptation is introduced on intelligent temporal encoding using background subtraction on simple MJPEG. This makes it simple, agile, robust, adaptive, end-user QoE aware yet bandwidth efficient. Democratized gaze-tracking for QoE adaptation with real-time user-context. Finally, this is a first of its kind practical system which integrates a simple RGB camera-based gaze tracking module at the operator which synchronously influences the transmitter and the protocol by supplying the instantaneous user context to the encoder-state machine.

A video quality-of-experience (QoE) for latency-sensitive interactive applications is modelled as in equation (1) as disclosed by applicant's prior patent applications:

$$E = f(V_q, P_F, \sigma, \delta, d) \tag{1}$$

wherein, E is an observed QoE in a given time span т, $V_q$ is an average visual quality of the frames across т, $P_F$ is a probability of freezing, $\sigma$ is a variance in distance between successive frames, $\delta$ is a gap between the achieved framerate and the desired rate for the present context, and d is a perceived delay with respect to a local actuation.

Apart from $V_q$, the rest are dependent variables influenced by the ratio of present bitrate (b) vs the channel capacity, and the present frame rate (R). In order to maintain E, b cannot be reduced drastically as that would adversely affect $V_q$. So, a reference for $V_q$ is maintained as a constraint and, to practically create a tunable mechanism, the equation (1) needs to be redefined as equation (2):

$$E' = f(V_q, R) \tag{2}$$

where $V_q$ is expressed as in equation (3).

In the present disclosure, the foveal region is defined as a circle with dynamically determined radius and a dynamically determined center. The center of the foveal region is dynamically determined using external triggers reflecting the remote operator's eye-gaze. The foveal radius is dynamically adapted in response to instantaneous channel conditions. This adapts the area of the foveal region. Thus, under degrading and improving channel conditions the area of foveal region is reduced and increased respectively by dynamic adaptation of the foveal radius. The increase and decrease in area of foveal region is referred to as foveal expansion and shrinking respectively. Together they are referred to as Foveal Breathing.

$$V_q = \{V_{q_{fov}} \cup V_{q_{per}}\} \tag{3}$$

wherein, $V_{q_{fov}}$ is a quality within the foveal region, $V_{q_{per}}$ is a quality at the peripheral region beyond the foveal region. A ratio G=A/A' is defined where A is an area under foveal region, A' is an area under peripheral region. To maintain QoE, the whole tunable mechanism to be constrained by $V_{q_{fov}}$. G is a foveal breathing parameter which controls foveal breathing. Thus, the equation (2) is further modified as equation (4):

$$E'' = f(V_{qfov}, V_{qper}, G, R) \qquad (4)$$

Thus, the equation (4) is equipped with four handles for the tuning. Let, $\rho_k \forall k \in \{0, \ldots, 3\}$ denote the priority of operation for each of the components in right hand side of equation 4 respectively. At any instant, based on the present condition, the process should identify the set of indices i such that, $\rho_i > \rho_j$ where $i,j \subseteq \{0, \ldots, 3\}$ and the parameters corresponding to the indices in i are tuned. Under a degrading channel condition, the normally desired sequence of ordering of $\rho_k$ would be as in equation (5):

$$\rho_1 > \rho_2 > \rho_3 > \rho_0 \qquad (5)$$

Thus, initially desired bitrate to be achieved by tuning the quality (in terms of quantization) in the peripheral region. Once a limit of matrix sparsity is reached, the foveal breathing is followed by reducing G to achieve the desired bitrate. Then, the frame rate is reduced extrinsically to a certain threshold. Finally, if all the previous tunings do not yield then the quality of the present foveal region needs to be reduced. In ideal case, the reduction of the quality of the foveal region is not exercised. The tuning may also lead to improving all the factors when channel condition improves and in an ideal situation, $V_{qfov} = V_{qper}$.

In the best possible scenario when $V_{qper} \rightarrow V_{qfov}$, $G \rightarrow \infty$.

In the worst scenario when $V_{qfov} \rightarrow V_{qper}$, $G \rightarrow 0$.

FIG. 1 illustrates an exemplary application scenario for methods and systems of the present disclosure. In the exemplary application scenario of FIG. 1, a transmitter Tx 120, a receiver Rx 130, and a communication network 140 having the end-to-end transmission channel are present. The transmitter Tx 120 transmits the video obtained through a video producing unit (not shown in FIG. 1) through the communication network 140 and the receiver Rx 130 receives the video via a video consuming unit (not shown in FIG. 1). The video producing unit may be a video source unit, a video acquisition unit such as camera, video sensor, and so on. The video consuming unit may be the end device where the video is being viewed or displayed. In a typical scenario, the mobile robot may act as the transmitter Tx 120 and the human operator may act as the receiver Rx 130.

Referring now to the drawings, and more particularly to FIG. 2 through FIG. 9I, where similar reference characters denote corresponding features consistently throughout the figures, there are shown preferred embodiments, and these embodiments are described in the context of the following exemplary systems and/or methods.

Figure 2:
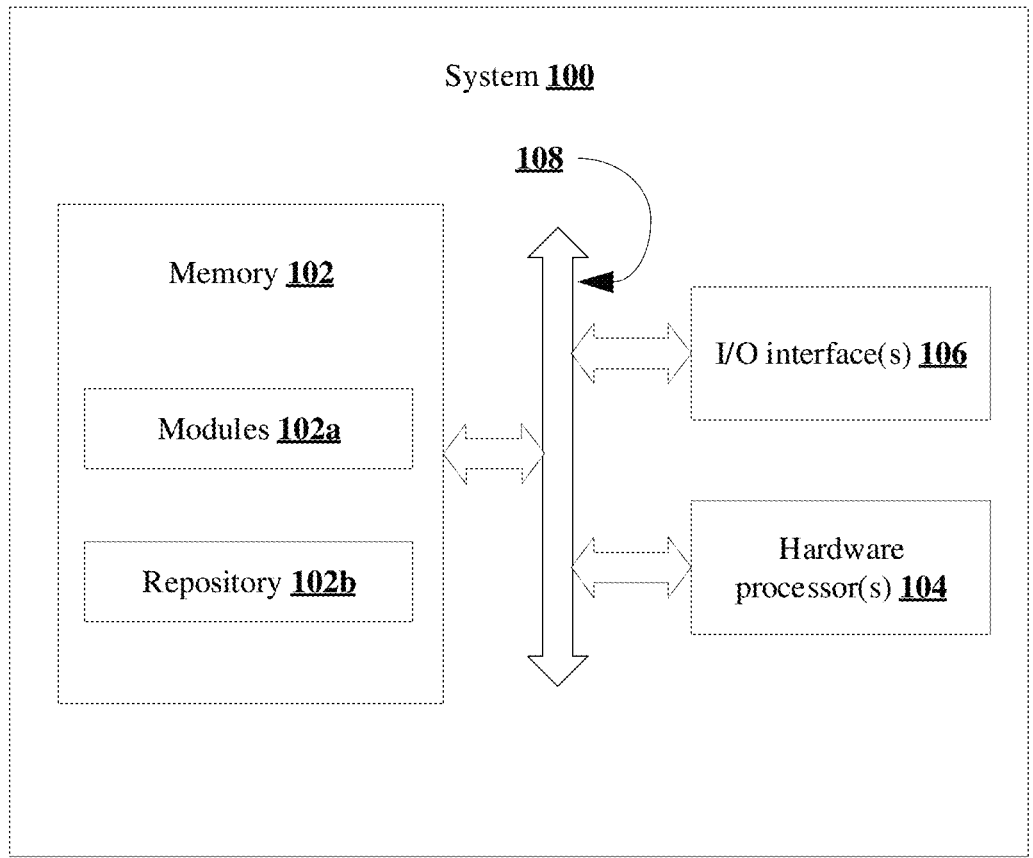
FIG. 2 is an exemplary block diagram of a system to synergize context of end-user with quality-of-experience of live video feed, in accordance with some embodiments of the present disclosure.

FIG. 2 is an exemplary block diagram of a system 200 to synergize context of end-user with quality-of-experience of live video feed, in accordance with some embodiments of the present disclosure. In an embodiment, the system 200 includes or is otherwise in communication with one or more hardware processors 204, communication interface device(s) or input/output (I/O) interface(s) 206, and one or more data storage devices or memory 202 operatively coupled to the one or more hardware processors 204. The one or more hardware processors 204, the memory 202, and the I/O interface(s) 206 may be coupled to a system bus 208 or a similar mechanism.

The I/O interface(s) 206 may include a variety of software and hardware interfaces, for example, a web interface, a graphical user interface, and the like. The I/O interface(s) 106 may include a variety of software and hardware interfaces, for example, interfaces for peripheral device(s), such as a keyboard, a mouse, an external memory, a plurality of sensor devices, a printer and the like. Further, the I/O interface(s) 206 may enable the system 200 to communicate with other devices, such as web servers and external databases.

The I/O interface(s) 206 can facilitate multiple communications within a wide variety of networks and protocol types, including wired networks, for example, local area network (LAN), cable, etc., and wireless networks, such as Wireless LAN (WLAN), cellular, or satellite. For the purpose, the I/O interface(s) 206 may include one or more ports for connecting a number of computing systems with one another or to another server computer. Further, the I/O interface(s) 206 may include one or more ports for connecting a number of devices to one another or to another server.

The one or more hardware processors 204 may be implemented as one or more microprocessors, microcomputers, microcontrollers, digital signal processors, central processing units, state machines, logic circuitries, and/or any devices that manipulate signals based on operational instructions. Among other capabilities, the one or more hardware processors 204 are configured to fetch and execute computer-readable instructions stored in the memory 202. In the context of the present disclosure, the expressions 'processors' and 'hardware processors' may be used interchangeably. In an embodiment, the system 200 can be implemented in a variety of computing systems, such as laptop computers, portable computers, notebooks, hand-held devices, workstations, mainframe computers, servers, a network cloud and the like.

The memory 202 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. In an embodiment, the memory 202 includes a plurality of modules 202a and a repository 202b for storing data processed, received, and generated by one or more of the plurality of modules 202a. The plurality of modules 202a may include routines, programs, objects, components, data structures, and so on, which perform particular tasks or implement particular abstract data types.

The plurality of modules 202a may include programs or computer-readable instructions or coded instructions that supplement applications or functions performed by the system 200. The plurality of modules 202a may also be used as, signal processor(s), state machine(s), logic circuitries, and/or any other device or component that manipulates signals based on operational instructions. Further, the plurality of modules 202a can be used by hardware, by computer-readable instructions executed by the one or more hardware processors 204, or by a combination thereof. In an embodiment, the plurality of modules 202a can include various sub-modules (not shown in FIG. 2). Further, the memory 202 may include information pertaining to input(s)/output(s) of each step performed by the processor(s) 204 of the system 200 and methods of the present disclosure.

The repository 202*b* may include a database or a data engine. Further, the repository 202*b* amongst other things, may serve as a database or includes a plurality of databases for storing the data that is processed, received, or generated as a result of the execution of the plurality of modules 202*a*. Although the repository 202*b* is shown internal to the system 200, it will be noted that, in alternate embodiments, the repository 202*b* can also be implemented external to the system 200, where the repository 202*b* may be stored within an external database (not shown in FIG. 2) communicatively coupled to the system 200. The data contained within such external database may be periodically updated. For example, data may be added into the external database and/or existing data may be modified and/or non-useful data may be deleted from the external database. In one example, the data may be stored in an external system, such as a Lightweight Directory Access Protocol (LDAP) directory and a Relational Database Management System (RDBMS). In another embodiment, the data stored in the repository 202*b* may be distributed between the system 200 and the external database.

Figure 3B:
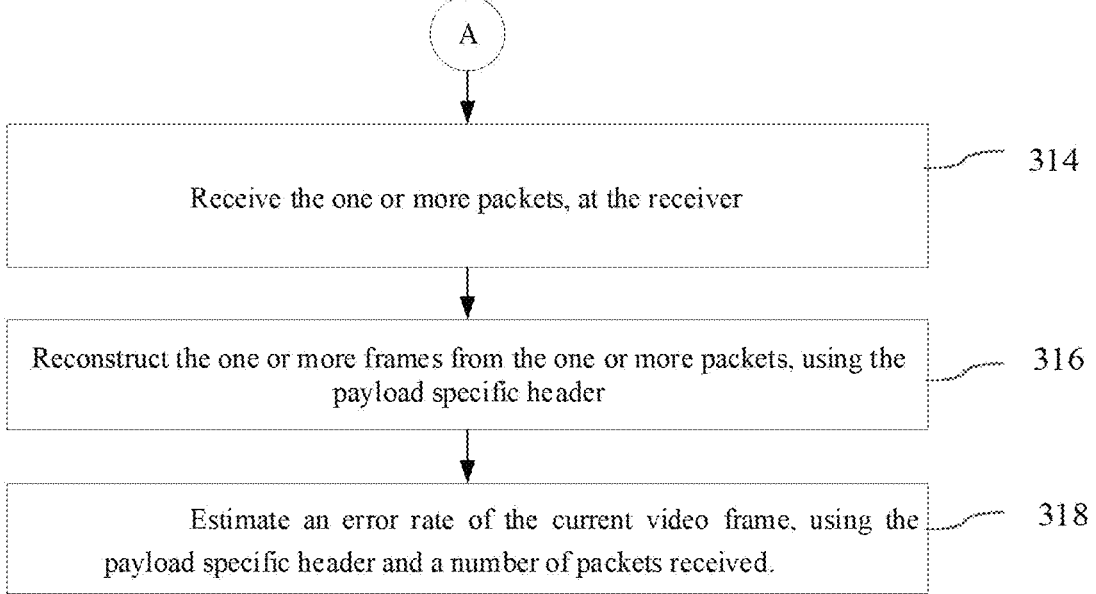

Referring to FIGS. 3A through 3B, components and functionalities of the system 200 are described in accordance with an example embodiment of the present disclosure. For example, FIGS. 3A through 3B illustrate exemplary flow diagrams of a processor-implemented method 300 illustrating the protocol semantics, transmitter and receiver side operations to achieve dynamic foveated rendering, in accordance with some embodiments of the present disclosure. Although steps of the method 300 including process steps, method steps, techniques or the like may be described in a sequential order, such processes, methods, and techniques may be configured to work in alternate orders. In other words, any sequence or order of steps that may be described does not necessarily indicate a requirement that the steps be performed in that order. The steps of processes described herein may be performed in any practical order. Further, some steps may be performed simultaneously, or some steps may be performed alone or independently.

At step 302 of the method 300, the one or more hardware processors 204 of the system 200 are configured to define for a current video frame of a live video stream transmitted by a transmitter using an acquisition device 208 (not shown in FIG. 2), (i) a foveal region as a circle with a dynamically determined radius and a center, and (ii) a peripheral region as a region of a frame surrounding the foveal region.

The foveal region is defined as a circle around an arbitrary pixel on the frame as the center with the adaptive radius R for a given percentage u such that:

$$\hat{R} = \text{Max}(\textit{ImageHeight}, \textit{ImageWidth}) \cdot \mu / 100 \qquad (6)$$

wherein μ is the foveal radius percentage factor.

At step 304 of the method 300, the one or more hardware processors 204 of the system 200 are configured to receive at the transmitter, (i) an instantaneous feedback of a video quality, from the receiver Rx, upon an expiry of a periodic timer present at the receiver Rx. In addition to the instantaneous feedback of the video quality, 2-dimensional (2-D) eye-gaze coordinates of the end-user present from the receiver are also received on the periodic timer expiry.

In an embodiment, the transmitter Tx in the present disclosure maintains the periodic timer as present in ARV of the applicant. On expiry of the periodic timer the transmitter Tx transmits the first packet of the present frame in flight in CON (Confirmable) mode, but with no retransmission. The tuning decision in optimizing the QoE depends on the periodic feedback(s). At each playout interval t, the receiver Rx determines the total number of expected packets for each frame by parsing the offset field of first packet containing the position indicator for the last packet in the frame. The receiver Rx uses this information to compute an Instantaneous Error Rate $I^t$ using the following equation (7):

$$I^t := \frac{N_{lost}}{N_{total}} \times 100 \qquad (7)$$

Using $I^t$, the receiver Rx computes a Cumulative error rate $C_{mk}{}^t := I^t + C_{mk}{}^{t-1}$ which indicates accumulated error between two instances of receiving CON packets. Additionally, the receiver Rx maintains a log of $I^t$ at time t marking the end of present play-out interval. Whenever the receiver Rx receives a CON packet on periodic timer expiry, it computes a predominant Error Rate $P^t := \text{Mode}(I^t, I^{t-1}, \ldots, I^{t-k})$ where $P^t$ indicates the most frequent Error Rate within the interval t and t-k, where t-k is the time when the receiver Rx last received a CON packet. The receiver Rx piggybacks $C_{mk}{}^t$ and $P^t$ with ACK of CON packet. The instantaneous feedback of the video quality refers to the computed values of instantaneous cumulative and predominant error rate that is sent at periodic Timer expiry.

At step 306 of the method 300, the one or more hardware processors 204 of the system 200 are configured to employ a dynamic foveated rendering for rendering the one or more successive video frames of the live video stream, at the transmitter, by dynamically adapting the center of the foveal region based on the 2-D eye-gaze coordinates of the end-user.

Figure 4:
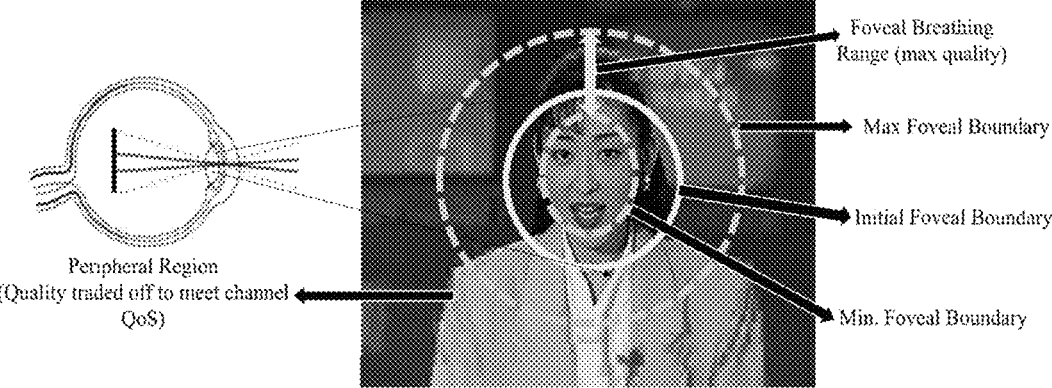
FIG. 4 illustrates an exemplary view of a foveation-based realization of intra-frame quality variation, in accordance with some embodiments of the present disclosure.

The center of the foveal region is dynamically determined using external triggers reflecting eye gaze coordinates or the remote operator or the end-user. This is achieved using the instantaneous 2D eye gaze co-ordinates of the end-user obtained from the periodic feedback from Rx. Additionally, the instantaneous radius of the foveal region is computed based on the current value of μ. The instantaneous center and radius hence determined are used to define the current foveal region of the frame. The part of the image beyond the foveal region is called the peripheral region. FIG. 4 illustrates an exemplary view of a foveation-based realization of intra-frame quality variation, in accordance with some embodiments of the present disclosure.

Figure 5:
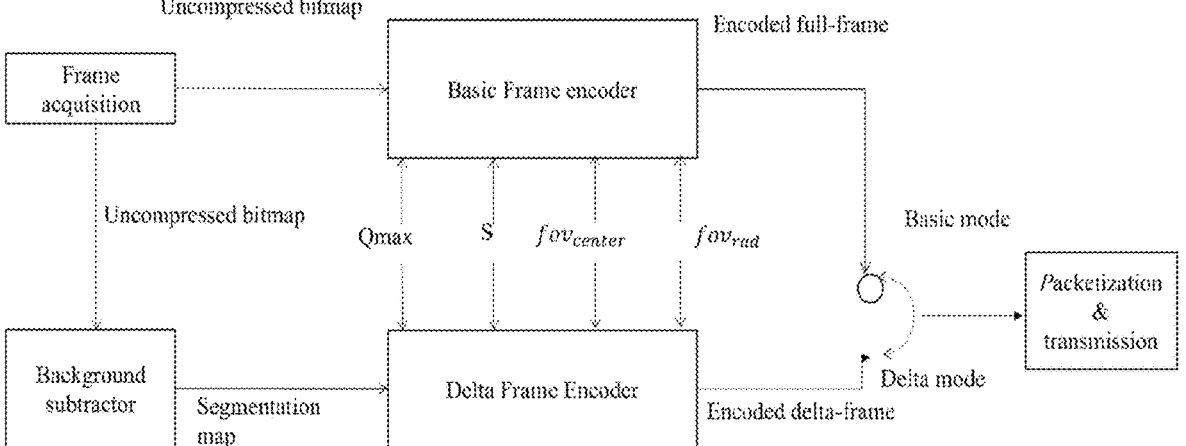
FIG. 5 shows a dynamic foveation-centric spatio-temporal encoding performed at the transmitter, and various inputs parameters are supplied to the spatial encoder of both basic and delta encoded frames to achieve dynamic foveation-centric spatial encoding, in accordance with some embodiments of the present disclosure.

FIG. 5 shows a dynamic foveation-centric spatio-temporal encoding performed at the transmitter, and various inputs parameters are supplied to the spatial encoder of both basic and delta encoded frames to achieve dynamic foveation-centric spatial encoding, in accordance with some embodiments of the present disclosure. As shown in FIG. 5, both basic as well as delta frame encoders perform foveation-centric spatial encoding of basic and delta frames respectively considering the instantaneous foveal region determined using the dynamically adaptive radius and dynamically determined center.

FIG. 6 is an exemplary flow diagram showing steps illustrating how the instantaneous 2D end-user eye-gaze co-ordinates are retrieved from an online tracker and subsequent post processing of eye-gaze co-ordinates to achieve dynamic foveated rendering. As shown in FIG. 6, employing the dynamic foveated rendering for rendering the one or more successive video frames of the live video stream to achieve QoE is explained through steps 306*a* to 306*d*.

Figure 7A:
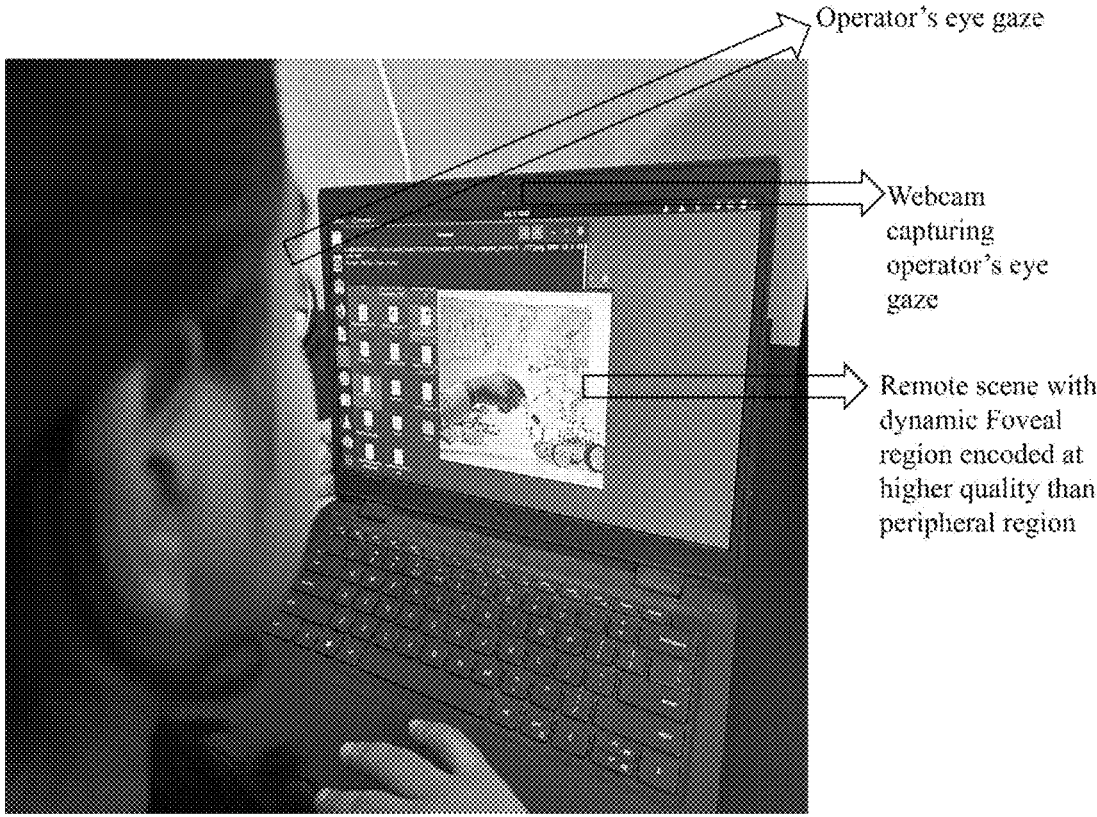
FIG. 7A shows continuous capturing of the instantaneous eye-gaze location of the end-user using an eye-tracker module and the dynamic foveated rendering mechanism is getting reflected on the live video streamed over the viewing canvas window, in accordance with some embodiments of the present disclosure.

At step 306a, an online eye-tracker module is run in parallel to the receiver Rx. The eye-tracker module continuously retrieves the instantaneous eye-gaze location of end-user on the screen. The receiver Rx periodically invokes the eye-tracker module to retrieve the instantaneous 2D eye-gaze co-ordinates. FIG. 7A shows continuous capturing of the instantaneous eye-gaze location of the end-user using an eye-tracker module and the dynamic foveated rendering mechanism is getting reflected on the live video streamed over the viewing canvas window, in accordance with some embodiments of the present disclosure.

Figure 7B:
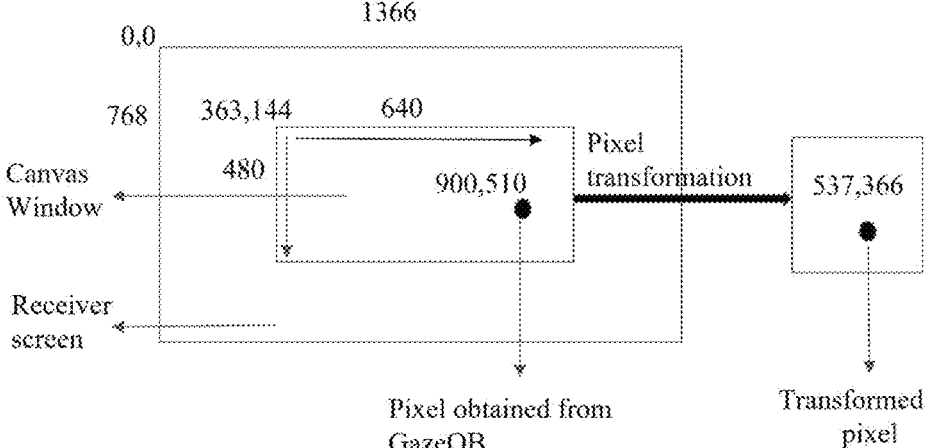
FIG. 7B shows pixel transformation of the captured eye-gaze location of the end-user to corresponding pixel co-ordinates with respect to viewing canvas window in the dynamic foveated rendering mechanism, in accordance with some embodiments of the present disclosure.

As shown in FIG. 7A, the 2-D eye-gaze coordinates hence obtained are captured with respect to the entire receiver side screen. But the live streamed video on the receiver side screen is limited to viewing canvas window. Hence, at step 306b, the 2-D eye-gaze coordinates captured at step 306a are transformed to corresponding co-ordinates with respect to a viewing canvas window. FIG. 7B shows pixel transformation of the captured eye-gaze location of the end-user to corresponding pixel co-ordinates with respect to viewing canvas window in the dynamic foveated rendering mechanism, in accordance with some embodiments of the present disclosure.

Next at step 306c, the 2-D eye-gaze co-ordinates are invalidated if they go beyond the viewing canvas window. That means, the 2-D eye-gaze co-ordinates that are within the viewing canvas window are only considered as valid coordinates at the transformation step 306b. Finally at step 306d, the error estimates of the current video frame are transmitted as the instantaneous feedback of the video quality along with the 2-D eye-gaze co-ordinates that are obtained at the transformation step 306b, on the periodic timer expiry.

Figure 7C:
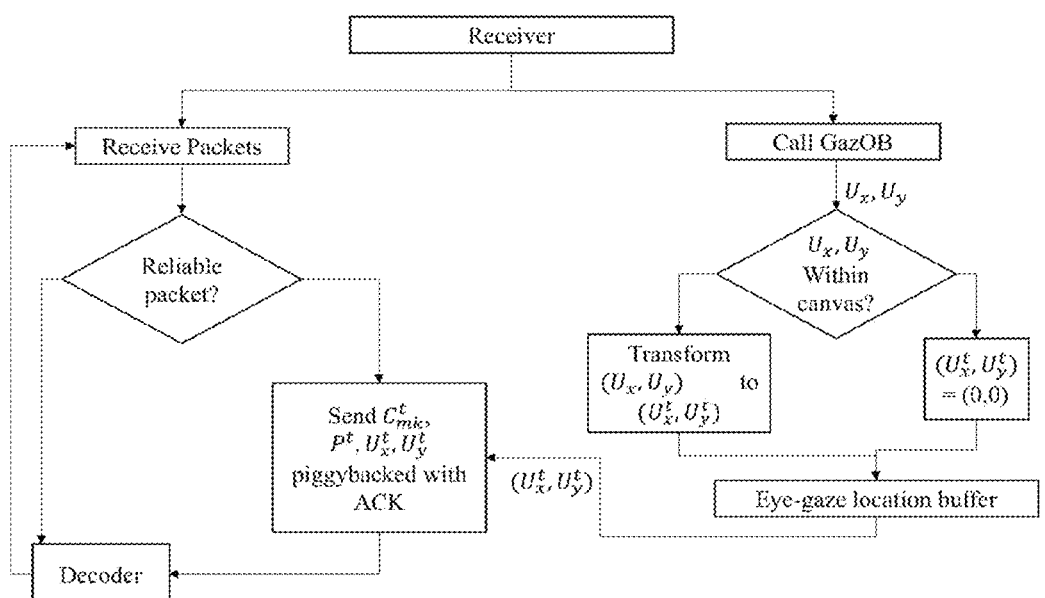
FIG. 7C is a flowchart depicting a process performed at the receiver to retrieve the instantaneous eye-gaze co-ordinates of end-user from an online eye-tracker module running in parallel on a periodic basis, followed by post processing of retrieved eye-gaze co-ordinates and subsequent transmission of this in ACK message to transmitter.
Figure 8A:
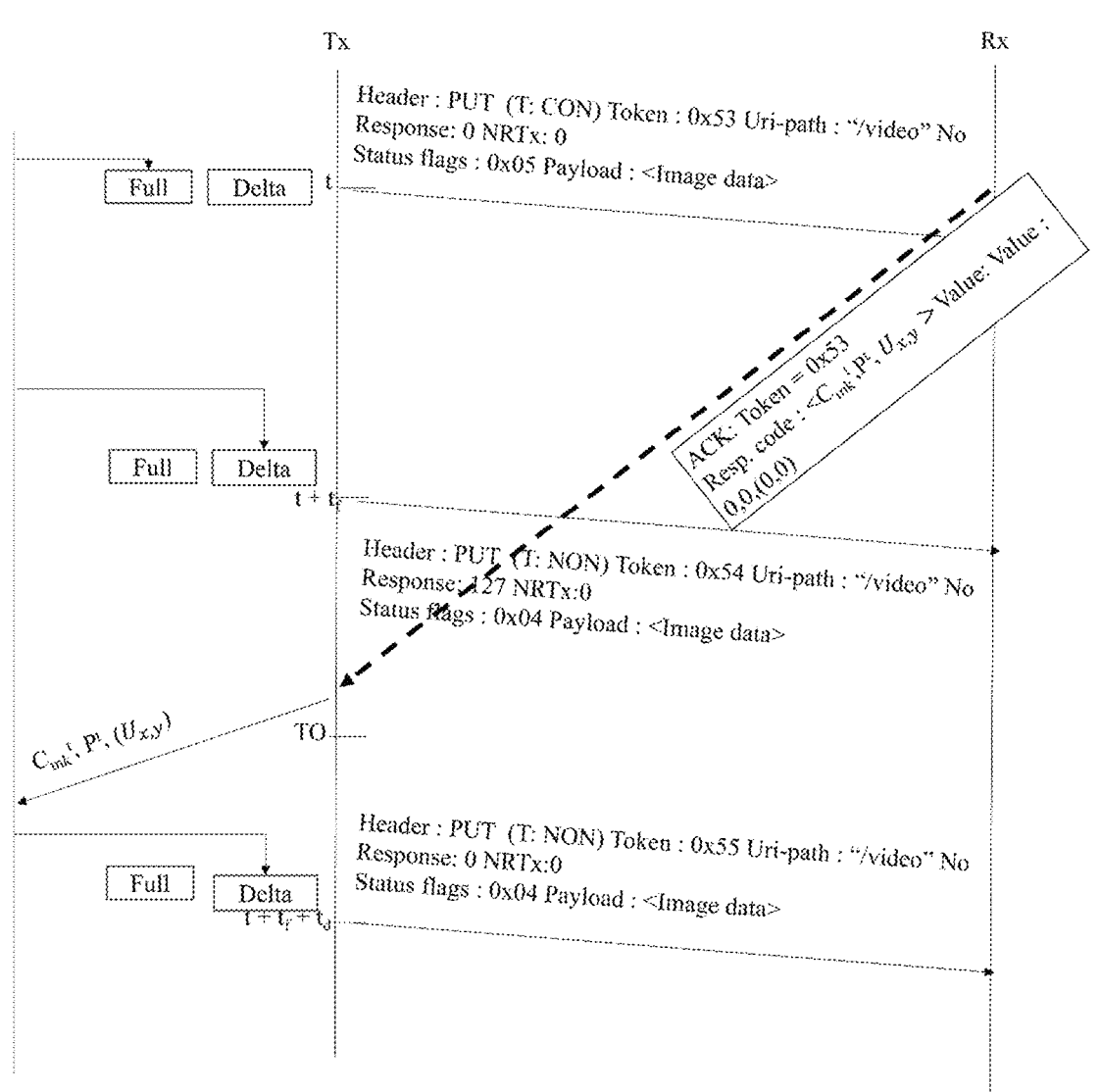
FIGS. 8A-8E shows timing diagrams in different situations comprising: (a) Tx gets ACK with periodic feedback from Rx signifying no loss at Rx and invalid 2D eye-gaze co-ordinates resulting in sending the next frame with improved bitrate with the instantaneous foveal region defined with a center set as the center of the current frame since invalid 2D eye-gaze co-ordinates are received, (b) Tx gets ACK with periodic feedback from Rx signifying loss at Rx above threshold and instantaneous 2D eye-gaze co-ordinates resulting in sending the next frame with reduced bitrate reduction with current foveal region defined using the received eye-gaze co-ordinates, (c) ACK lost for a full frame making Tx send next frame as full frame with foveal region defined with a center set as the center of the current frame since current 2D eye-gaze co-ordinates are not received, (d) ACK received before periodic timer expiry for a frame sent at previous expiration of periodic timer with error at Rx within threshold and instantaneous 2D eye-gaze co-ordinates of end-user. Transmitter sends the next frame as delta frame with foveal region defined using center as per the received 2D eye-gaze co-ordinates, (e) ACK belonging to a frame sent at periodic timer expiry is lost so, Tx sends the next frame with 'periodic timer status' flag set with foveal region defined with a center set as the center of the current frame since current 2D eye-gaze co-ordinates are not received, in accordance with some embodiments of the present disclosure.
Figure 8B:
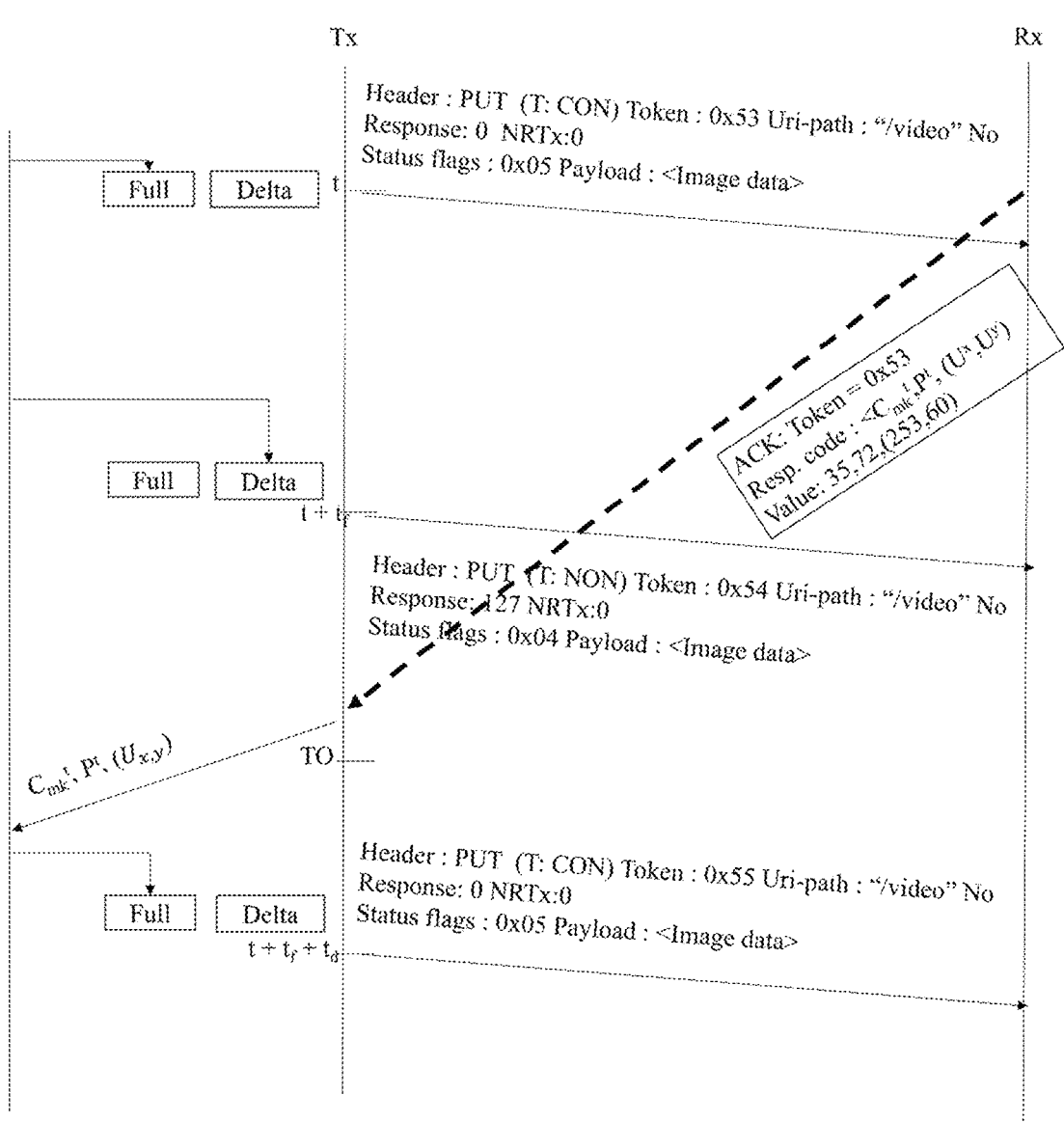
Figure 8C:
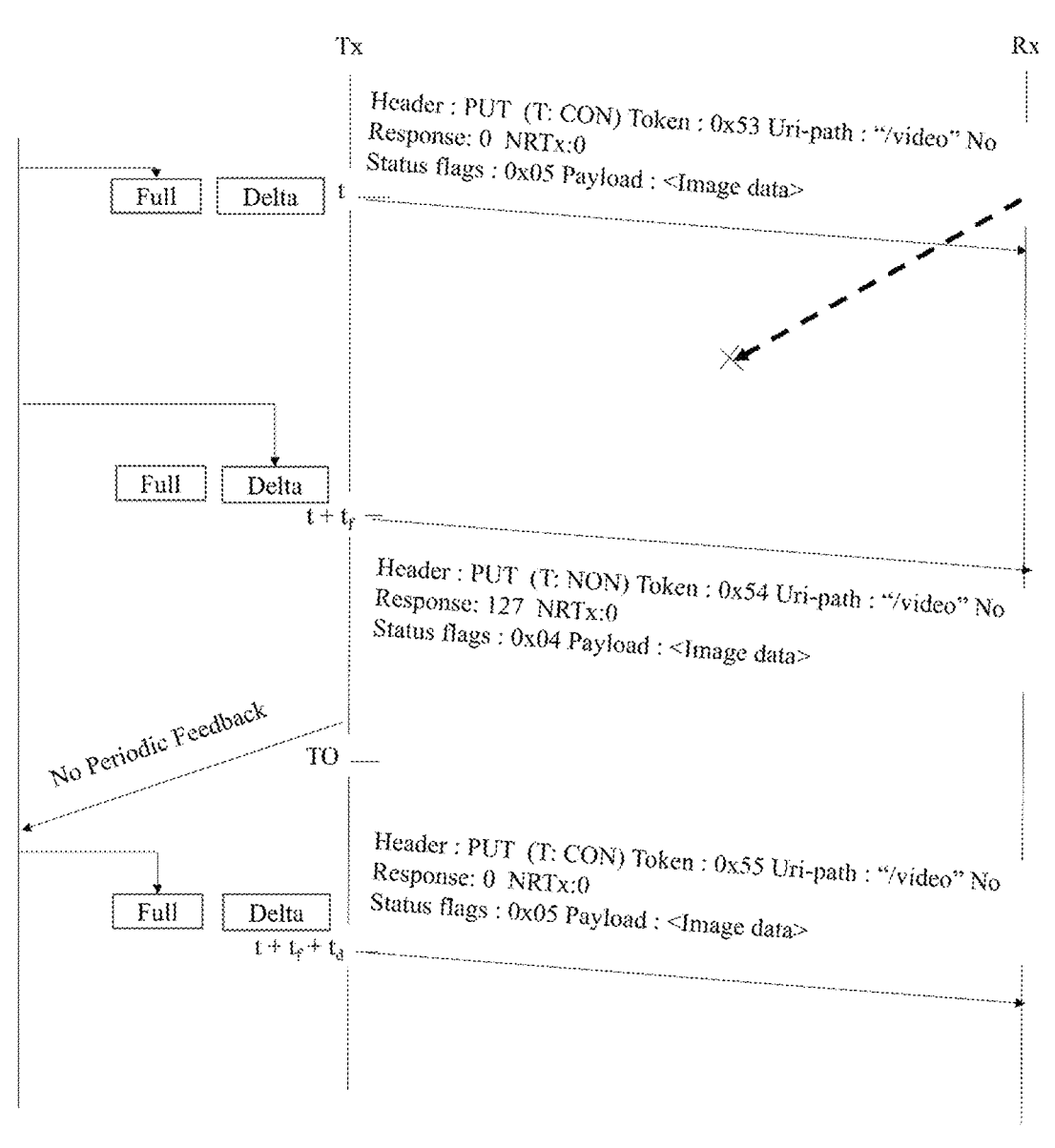
Figure 8D:
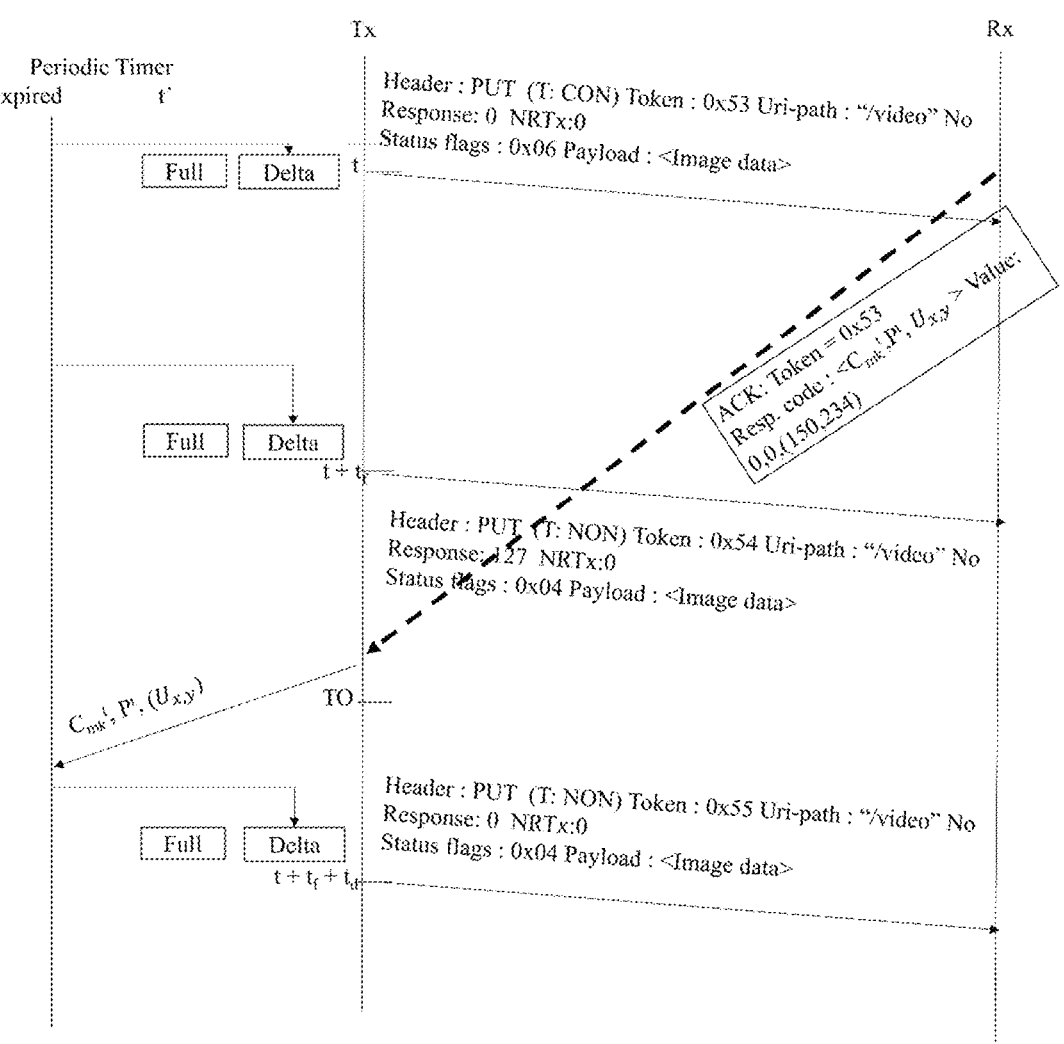
Figure 8E:
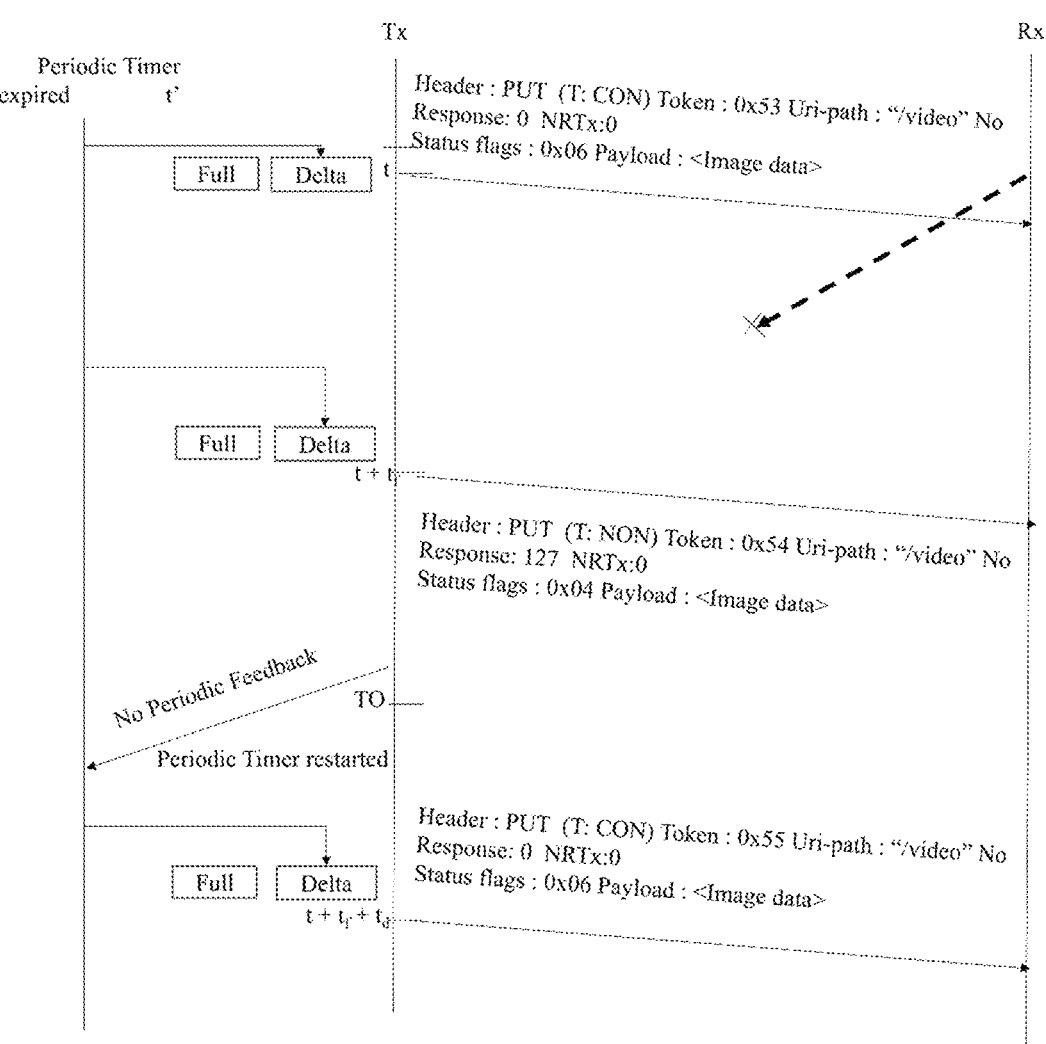

FIG. 7C is a flowchart depicting a process performed at the receiver to retrieve the instantaneous eye-gaze co-ordinates of end-user from an online eye-tracker module running in parallel on a periodic basis, followed by post processing of retrieved eye-gaze co-ordinates and subsequent transmission of this in ACK message to transmitter. As shown in FIG. 7C, the receiver Rx periodically calls GazOB module to retrieve the instantaneous the eye-gaze coordinates (location) of the end-user with respect to entire receiver side screen and transforms the coordinates with respect to receiver side screen to corresponding co-ordinates with respect to the viewing canvas window. Transmit the transformed 2D eye-gaze co-ordinates along with other computed error estimates piggybacked with ACK.

Dynamic determination for foveal center: High end-user QoE ensured by providing the part of the content which the user is currently interested in higher quality. The region of highest instantaneous visual attention on the screen is determined based on tracking eye movements of the end-user. The present disclosure employs a module called Gaze Observer (GazOB) which is integrated with the encoder and protocol states. The module begins by recording the gaze data using an online eye-tracker. The present disclosure can employ any real-time online eye-tracker to achieve the same purpose. The employed eye-tracker module in GazOB requires an initial training phase to calibrate the head and eye movements of the end-user. To determine end-user gaze locations on the screen, the currently employed eye-tracker in GazOB divides the entire screen into a grid of 4×5 cells. It determines the grid cell with the highest visual attention of the end-user. It then returns the pixel co-ordinates of the center of the estimated grid cell with respect to the entire receiver side screen.

The 2D eye-gaze co-ordinates obtained from GazeOB module are obtained with respect to the entire receiver side screen. The pixel co-ordinates on the receiver side screen, obtained from the GazOB module, have to be transformed into corresponding co-ordinate values on the canvas window which is the viewing window for the end-user. Let the width and height of entire receiver side screen be represented as $S_w$ and $S_h$ respectively. Let $C_w$ and $C_h$ refer to the width and height of the canvas window. The co-ordinates of center of foveal region obtained from GazOB are represented as ($U_x$, $U_y$). If ($U_x$, $U_y$) lies within the canvas window, then they are transformed into co-ordinates ($U_x^t$, $U_y^t$) as per the following set of equations. FIG. 6 depicts a pixel transformation to transform the 2-D eye-gaze coordinates to corresponding co-ordinates with respect to a viewing canvas window, in accordance with some embodiments of the present disclosure.

$$U_x^t = U_x - \frac{S_w - C_w}{2}$$

$$U_y^t = U_y - \frac{S_h - C_h}{2}$$

Before starting the receiver Rx, the currently employed eye-tracking module needs an initial calibration phase to match the eye pattern of the end-user. After this the receiver Rx is started with the GazOB module running in parallel in background. The receiver Rx runs two threads of execution simultaneously. One thread corresponds to reception of packets and decoding of received packets for frame rendering. The other thread corresponds to periodic invocation of the GazOB module by the receiver Rx to obtain the coordinates of the center of instantaneous foveal region. The periodicity of the call to GazOB module depends on the timeout value of the inherent Periodic Timer. For instance, if the periodic timer expires after every 1 sec, the time difference between two consecutive calls to GazOB module should be less than 1 sec so that the receiver Rx is always equipped with the instantaneous eye-gaze locations whenever it must send periodic feedback to the transmitter Tx. The Receiver piggybacks ($U_x^t$, $U_y^t$ along with other error estimates with the ACK of the reliable packet. If ($U_x$, $U_y$ goes beyond the canvas window, then the receiver Rx invalidates the eye-gaze co-ordinates so obtained by passing (0,0) value in the ($U_x^t$, $U_y^t$ field depicted by the following set of equations:

$$(U_x^t, U_y^t) = \begin{cases} (0, 0), & \text{if}(U_x, U_y)beyondcanvasboundary \\ (U_x^t, U_y^t), & \text{otherwise} \end{cases}$$

At the transmitter side Tx, the received instantaneous user eye-gaze location is analyzed. If the co-ordinates are (0,0), the transmitter Tx understands that eye-gaze location went beyond the canvas, hence sets the center of current foveal region as the center of the video frame. Otherwise uses the same co-ordinates obtained in the periodic feedback as the center of current foveal circle as per the following equations:

$$fov_{center} = \begin{cases} \left(\frac{C_w}{2}, \frac{C_w}{2}\right) & \text{if } (U_x^t, U_y^t = (0, 0) \\ (U_x^t, U_y^t), & \text{otherwise} \end{cases}$$

At step 308 of the method 300, the one or more hardware processors 204 of the system 200 are configured to perform at the transmitter, a foveation-centric spatial compression for both basic as well as Delta encoded frames, based on the dynamically determined radius and the center of the foveal region.

The temporal compression is achieved using background subtraction to generate delta frames. The spatial compression is achieved considering the instantaneous foveal region determined by instantaneous value of the radius and the center set as per the received 2D eye-gaze co-ordinates by adaptively switching between the foveal and the peripheral phases. In an embodiment, the spatio-temporal compression mechanism is employed as disclosed in applicant earlier inventions.

Spatial encoding scheme is inherited from previous disclosures. The spatial encoding is achieved by adaptively switching between peripheral and foveal phases. In peripheral phase, only the quality of peripheral region is adapted using nuances of quantization mechanism in JPEG encoding with the help of a dynamically determined scaling factor S. Whereas in foveal phase, the area of foveal region is increased or decreased by dynamically adapting to the foveal radius. This mechanism is referred to as foveal breathing and determines the instantaneous foveal radius that defines the current foveal region. The bitrate adaptation in each phase and adaptive switching between the two phases is accomplished based on the instantaneous feedback of video quality in periodic feedback.

The Temporal encoder in Tx generates Delta and Basic frames. The spatial encoder for Basic frames and Delta frames is referred to as Basic frame encoder and Delta Frame Encoder respectively. The Encoded frame is packetized and transmitted over the communication channel. Several input parameters are supplied to the spatial encoder to achieve QoE aware bitrate adaptation: the maximum quality factor ($Q_{max}$) that defines the quality of foveal region, Scaling factor(S) that is dynamically determined based on the instantaneous feedback of video quality and is used to determine the quality of peripheral region, coordinates of the center of the instantaneous foveal region (fov$_{center}$=($U_x{}^t$, $U_y{}^t$) and the radius of instantaneous foveal region (fov$_{rad}$) determined by the foveal breathing mechanism that together defines the current foveal region.

At step 310 of the method 300, the one or more hardware processors 204 of the system 200 are configured to packetize the one or more encoded successive video frames of the live video stream, into one or more packets, using a packetization technique.

The packetization technique converts the one or more encoded successive video frames of the live video stream into one or more packets to facilitate reconstruction and error concealment of the video frames at the receiver Rx.

The packetization happens such that an integral number of MCUs are placed in a single packet with necessary padding bits as MCUs are not byte aligned. The MCU Payload in each packet is preceded by a payload specific header. The present disclosure follows the protocol semantics and state machine of CoAP. In an embodiment, the reliable semantics is achieved through the CON (Confirmable) mode and best-effort by combining NON (Non-Confirmable) mode with No-response option. The CON mode transmissions are carried out in non-blocking mode as per the previous disclosure of the applicant. The Acknowledgement message from receiver carries the error estimates along with the instantaneous 2D eye-gaze co-ordinates of end-user. The new protocol header option disclosed previously named NRTx is used to manage maximum number of retransmissions allowed per packet. A simple yet effective Retransmission Timeout adaptation based on channel conditions disclosed in previous work is also employed.

At step 312 of the method 300, the one or more hardware processors 204 of the system 200 are configured to transmit the one or more packets obtained at step 310 of the method 300, to the receiver Rx, over the network communication channel at a predefined frame rate determined based on a chosen encoding scheme determined based on instantaneous value of an error estimates contained in the instantaneous feedback.

At step 314 of the method 300, the one or more hardware processors 204 of the system 200 are configured to receive the one or more packets sent by the transmitter Tx at step 312 of the method 300, at the receiver Rx.

The receiver side reconstruction, correction, reassembly of received video frames and jitter buffer adaptation are achieved using mechanism disclosed in previous patents. The receiver Rx performs reassembly of received packets depending on whether the received frame is Full or Delta encoded frames using the metadata information contained in the payload specific header of each packet. To tackle packet loss, Rx is also equipped with a frugal yet efficient loss handling mechanism for both basic and delta frames. In addition, to achieve smooth rendering of the live video, the receiver Rx employs a Kalman Filter based Jitter Buffer Adaptation mechanism as per the previous disclosure of the applicant.

At step 316 of the method 300, the one or more hardware processors 204 of the system 200 are configured to reconstruct the one or more frames from the one or more packets received at step 314 of the method 300, using the payload specific header. The reconstruction of the one or more frames is performed depending on the encoding scheme employed at the transmitter Tx for the live video streaming.

At step 318 of the method 300, the one or more hardware processors 204 of the system 200 are configured to estimate an error rate of the current video frame, using the payload specific header and a number of packets received. The semantics of the protocol headers allow the receiver Rx to determine the ratio of packets lost in a frame ($N_{lost}$) against the packets expected ($N_{total}$). The receiver Rx computes the instantaneous error rate $E^t$:

$$E^t = \frac{N_{lost}}{N_{total}} \times 100$$

Using $E^t$, the receiver Rx calculates two error estimates. One is the Cumulative Error rate ($C_{mk}{}^t$) which represents the accumulated error between the reception of two consecutive reliable packets and is computed as:

$$C_{mk}^t = E^t + C_{mk}^{t-1}$$

The receiver Rx also maintains a log of $E^t$ at each time interval $E^t$. Whenever the receiver Rx receives a reliable packet on periodic timer expiry, it computes the Predominant Error Rate $P^t$ as:

$$P^t = \text{Mode } (E^t, E^{t-1}, \ldots, \ldots, E^{t-k}$$

FIGS. 8A-8E shows timing diagrams in different situations comprising: (a) Tx gets ACK with periodic feedback from Rx signifying no loss at Rx and invalid 2D eye-gaze co-ordinates resulting in sending the next frame with improved bitrate with the instantaneous foveal region defined with a center set as the center of the current frame since invalid 2D eye-gaze co-ordinates are received, (b) Tx gets ACK with periodic feedback from Rx signifying loss at Rx above threshold and instantaneous 2D eye-gaze co-ordinates resulting in sending the next frame with reduced bitrate reduction with current foveal region defined using the received eye-gaze co-ordinates, (c) ACK lost for a full frame making Tx send next frame as full frame with foveal region defined with a center set as the center of the current frame since current 2D eye-gaze co-ordinates are not received, (d) ACK received before periodic timer expiry for a frame sent at previous expiration of periodic timer with error at Rx within threshold and instantaneous 2D eye-gaze co-ordinates of end-user. Transmitter sends the next frame as delta frame with foveal region defined using center as per the received 2D eye-gaze co-ordinates, (e) ACK belonging to a frame sent at periodic timer expiry is lost so, Tx sends the next frame with 'periodic timer status' flag set with foveal region defined with a center set as the center of the current frame since current 2D eye-gaze co-ordinates are not received, in accordance with some embodiments of the present disclosure.

Example Scenario:

The methods and systems of the present disclosure were implemented in C++ using OpenCV and Boost libraries. The methods and systems captured the raw frames and entire encoding happens in the own S/W without using any special H/W accelerator or encoding in camera firmware. The system was built on Ubuntu 20.04 on a standard Intel Core i5 machine. The transmitter side is ported to R-Pi3 which is housed in a telerobotic car designed for remote teleoperation. The present disclosure was designed to live stream both stored videos and live camera feed. A parallel WebRTC implementation built on JS was created with a media channel for video streaming and a data channel for exchanging kinematic controls and feedback(s).

To realize dynamic shifting of the foveal region, the dynamic foveated rendering was implemented in Python. The WebRTC system was also designed to transmit both stored video and live camera feed. The present disclosure was benchmarked with the WebRTC. For the present disclosure, the maximum desired framerate for Delta frames was set as 15 fps, the frame rate for Basic frame drops to 5 fps initially u was set at 50% with lowest limit as 15%, S was set at 50%, and desired quality factor was set at 9. The default video resolution was set at 640×480 (VGA).

The standard video sequences have been used for stored video transmission. Initially a full referential quality comparison (structural similarity index measure (SSIM), peak signal-to-noise ratio (PSNR), Video Quality Metric (VQM), Video Multimethod Assessment Fusion (VMAF)) is performed for stored video sequences under last mile channel degradation. To ensure a wide spectrum of different test cases comprising of static FoV, dynamic FoV, high motion, low motion, etc. Akiyo, Hall, Foreman and Tennis sequences respectively, are chosen and rescaled all to 640×480 resolution. For testing the impact of last-mile impairments, both Tx and Rx were kept in the same WiFi network and the access point was moved 'far from-and-near to' the test set up in a U-shaped trajectory.

Figure 9A:
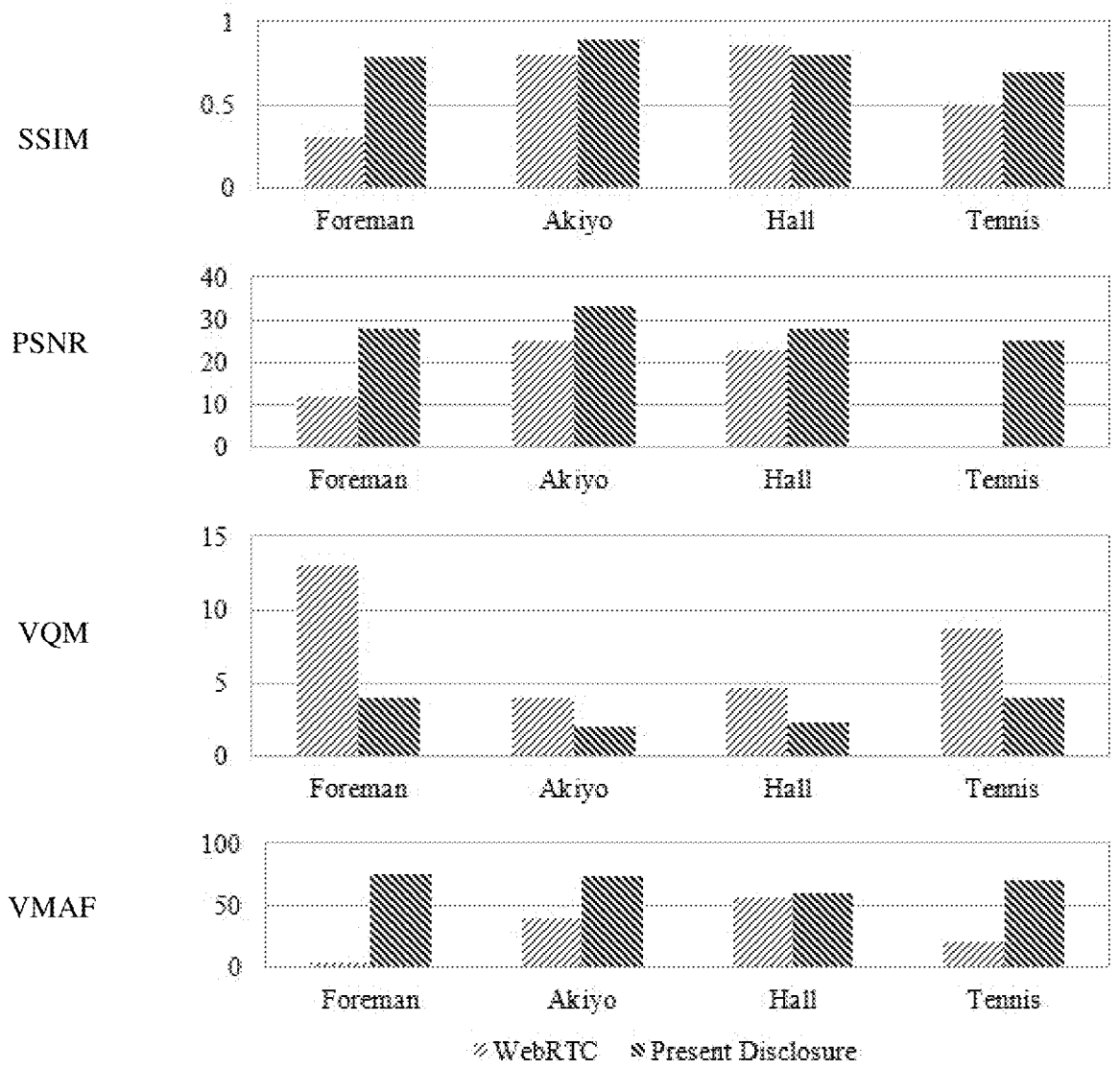
FIG. 9A is a graph showing a performance comparison between the present disclosure and WebRTC on full referential visual metric for last mile channel degradations.

To enable full referential comparison for objective quality comparison, a stream recording mechanism was created in the receiver and transmitter pages in the WebRTC system. For WebRTC the samples were all WebM encoded. FIG. 9A is a graph showing a performance comparison between the present disclosure and WebRTC on full referential visual metric for last mile channel degradations. In case of WebRTC the Rx side rendering starts to degrade much early as the Received Signal Strength Indicator (RSSI) starts to dip. In the interest of maintaining the bitrate the encoder compresses the video heavily and at times the whole resolution of the video was reduced with the video freezing for several seconds and takes quite some time to recover despite recovery in RSSI making it not so suitable for delay sensitive applications. The packet flow starts from a peak and dips as it approaches the lossy zone and, in some cases, there was practically silence. This behavior was also observed in the browser log of the packet loss reports and the selective ACKs reported from RTCP. What was more interesting was that, in some cases, though the video freezes, still the Tx keeps on pumping the data. These are cases where the GOP has gone out of sync due to loss of I-frames while, unaware of the application going out-of-sync, the transport was keeping the flow alive until feedback was received from RTCP. This was attributed to the GOP based encoded stream as loss of an I frame causes entire GOP to be dropped at the receiver. But the present disclosure continued decent performance and tried to regain lost frames through its zero overhead error concealment described earlier. There was a momentary freeze around the deep degradation of RSSI. But due to agile frame-by-frame operation, it regained quickly as soon as RSSI started to rise just above −70 dB.

Then the system was deployed over a long-haul P2P setting. The transmitter on the Pi-car was put in Kolkata, India. The operator console was in Bangalore, India. Both units were put in private networks behind restrictive NATs which do not allow hole punching. This ensured that WebRTC will always have to route through TURN server. A relay service was also created, collocated with the TURN server for establishing NAT-independent P2P for the present disclosure. The TURN and the relay servers were replicated in three different AWS instances in Mumbai (India), Tokyo (Japan), and Ohio (US-east). This way, the performance under communication was tracked over Internet backbones running through different parts of the world. The experiment was conducted in a real teleoperation scenario.

Figure 9B:
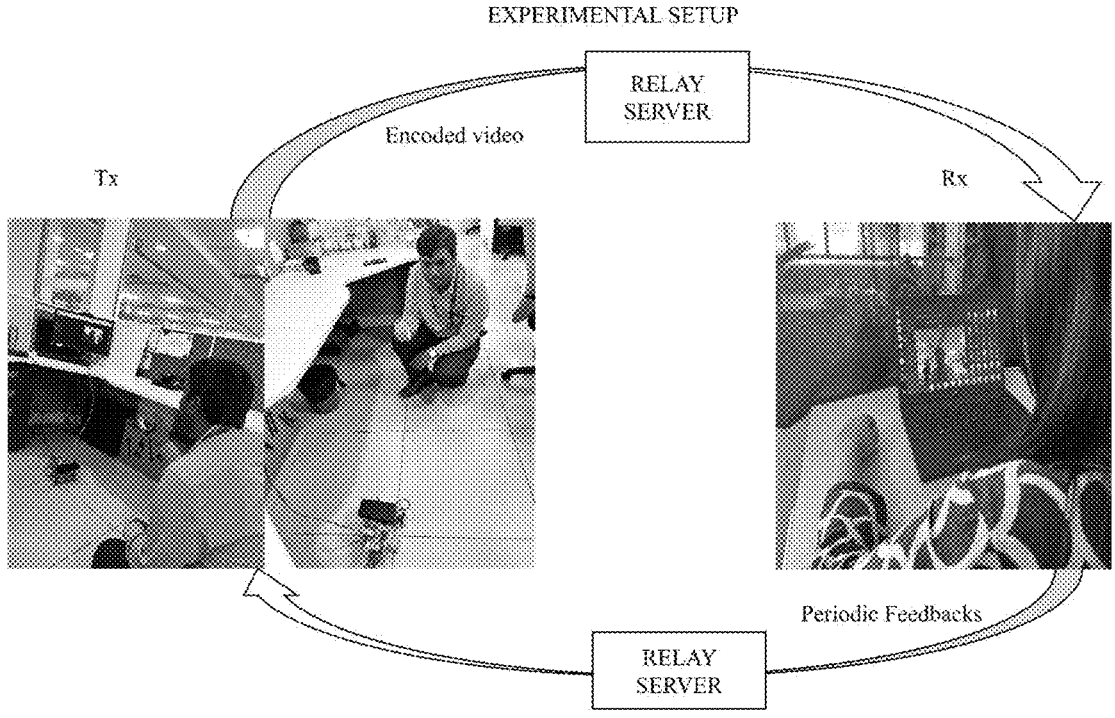
FIG. 9B shows a setup for long-haul telerobotic experiment, in accordance with some embodiments of the present disclosure.

FIG. 9B shows a setup for long-haul telerobotic experiment for dynamic foveated rendering, in accordance with some embodiments of the present disclosure. As shown in FIG. 9B, a person in Kolkata threw a ball on the floor in a given trajectory, and the person in Bangalore had to track the ball by moving the Pi-car remotely. While WebRTC system was equipped with data channel for this purpose, a special control console was created for operating while observing feeds using the present disclosure. The control commands were also relayed through the same relay server. Also experimented on 20 users aged between 25-45 years. Each user was told to do the 'ball-tracking' exercise for 15 times in each sitting. Out of the 15 times the traffic was routed through Mumbai, Tokyo and Ohio for 5 times each. The experiment was repeated for the same subjects over a span of 5 days at different time of the day (morning, afternoon, evening). Each time the stream was recorded for full referential measures of the videos and the operators in Bangalore were told to mark the experience on a scale of 5. The Wireshark was used to measure the live BW consumption for each experiment.

Figure 9C:
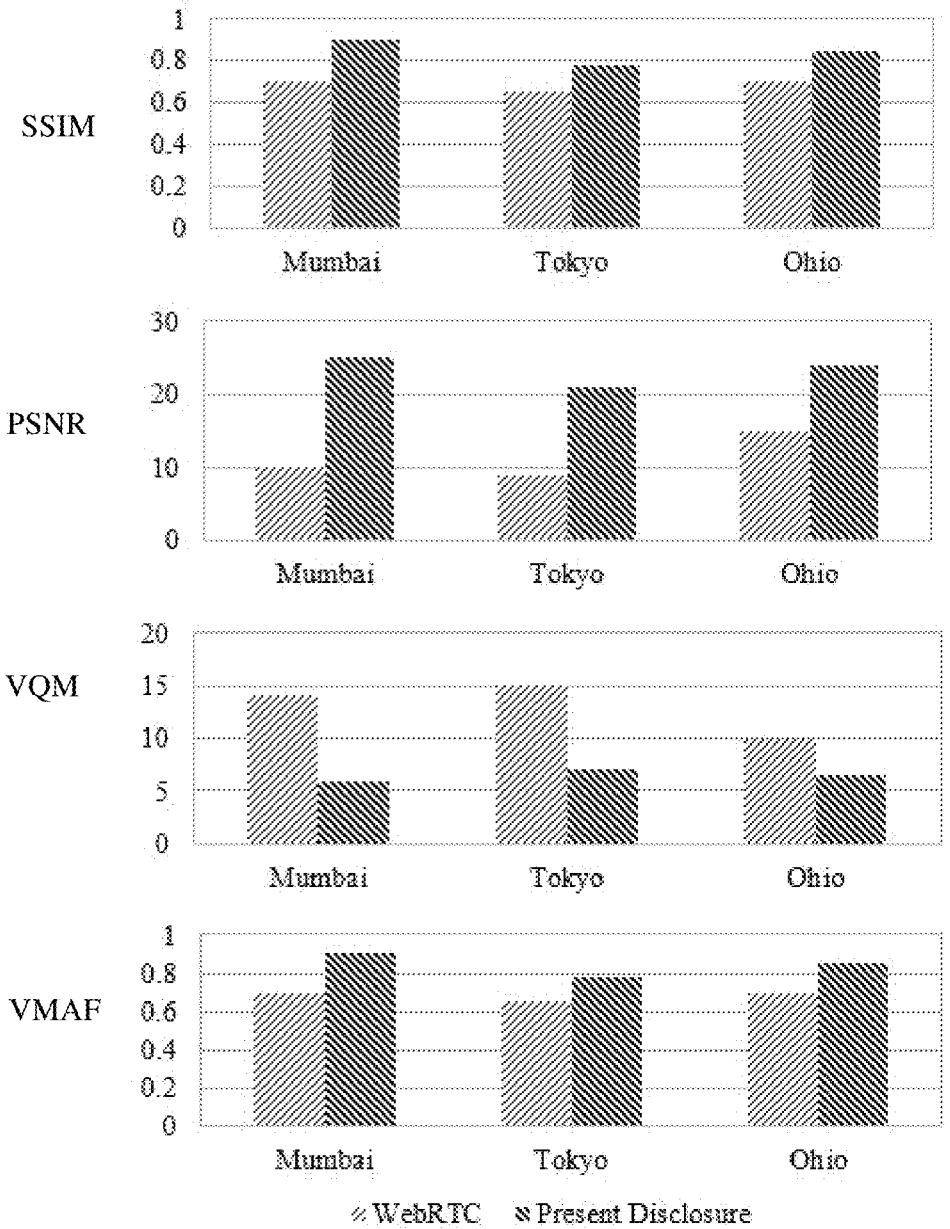
FIG. 9C is a graph showing a performance comparison of the present disclosure with WebRTC on full-referential quality metric for the long-haul experimental setup shown in FIG. 9B.
Figure 9D:
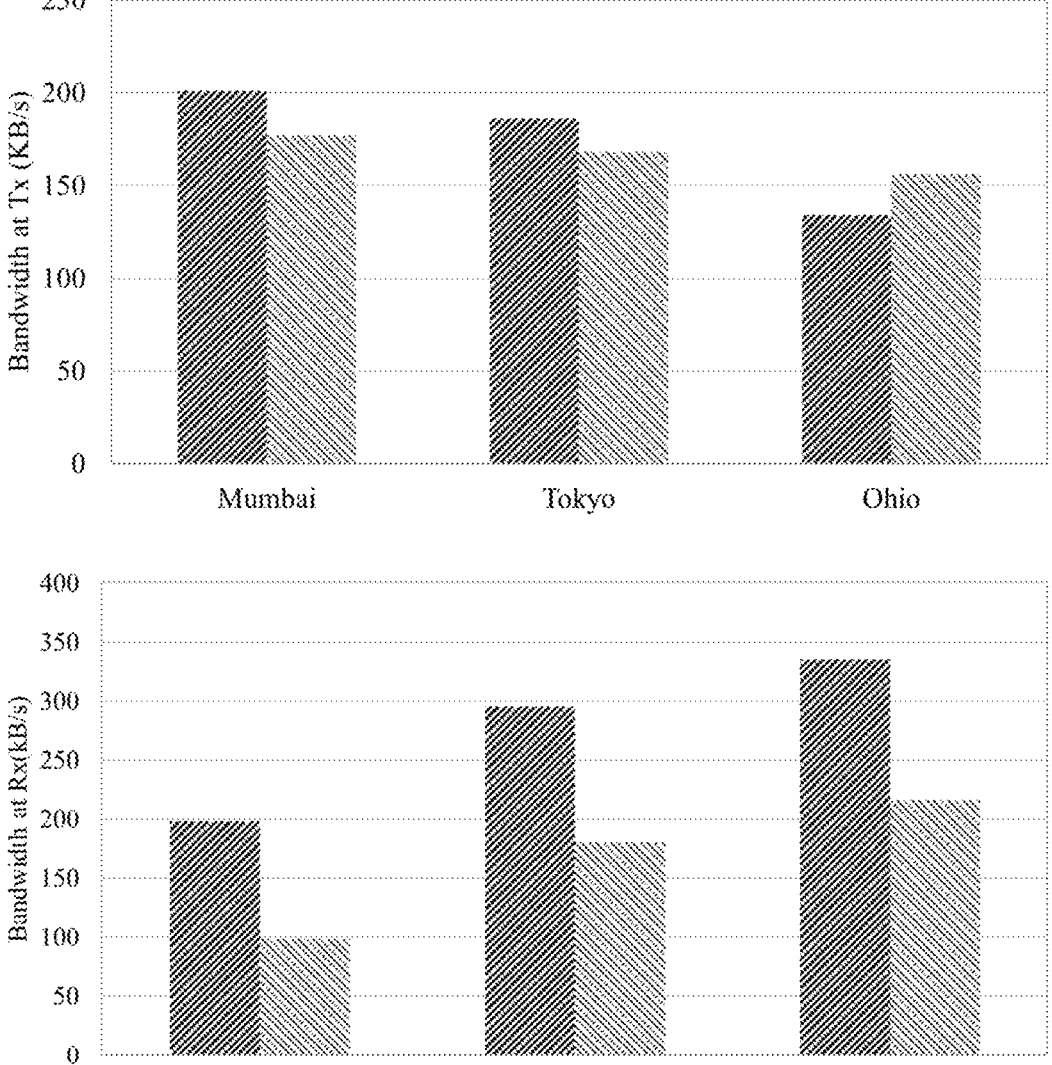
FIG. 9D is a graph showing a comparative bandwidth consumption at Tx & Rx for live streaming via relay servers at Mumbai, Ohio & Tokyo, in accordance with some embodiments of the present disclosure.
Figure 9E:
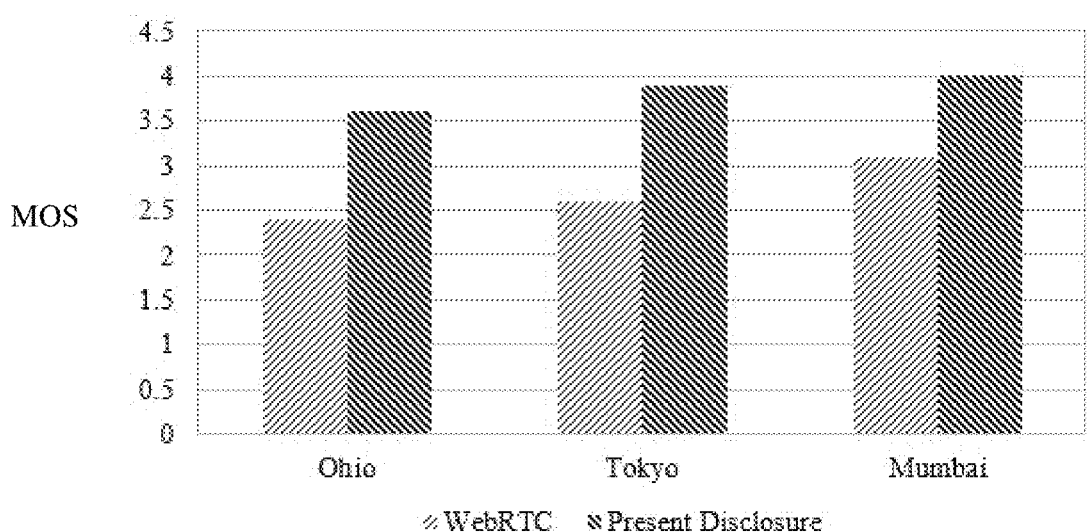
FIG. 9E is a graph showing MOS scores comparison for present disclosure with WebRTC for a typical Teleoperation scenario for long haul experimental shown in FIG. 9B for streaming via Relay servers located in Mumbai, Tokyo, Ohio, in accordance with some embodiments of the present disclosure.
Figure 9F:
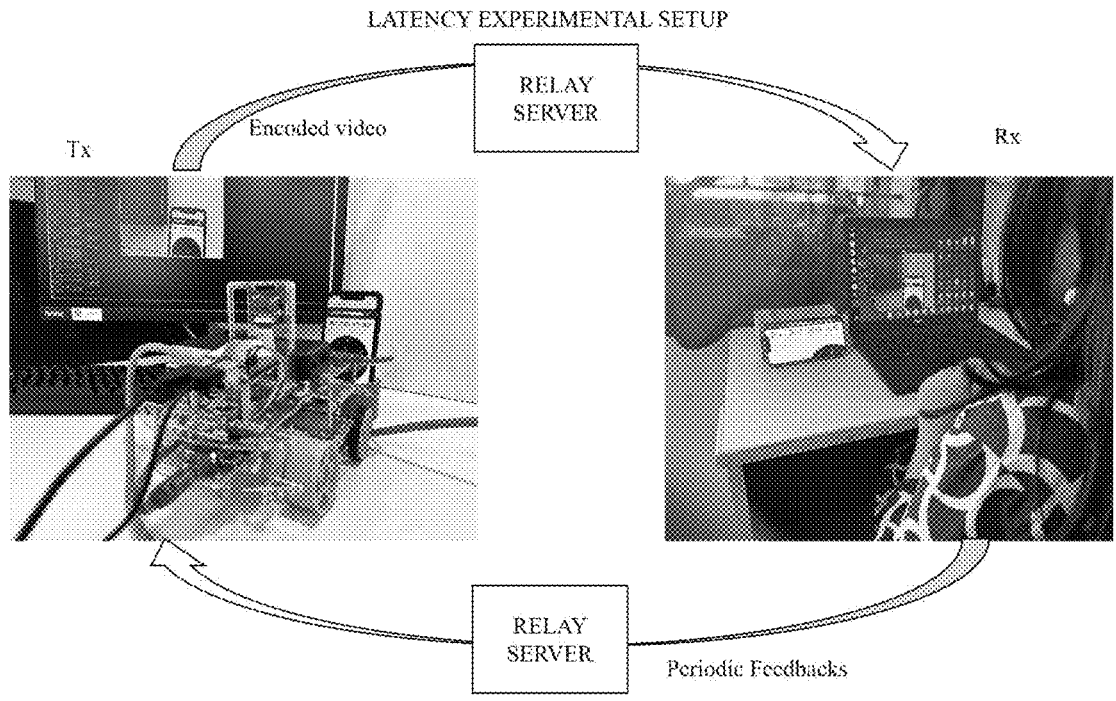
FIG. 9F shows a setup for a latency measurement, in accordance with some embodiments of the present disclosure.

FIG. 9C is a graph showing a performance comparison of present disclosure with WebRTC on full-referential quality metric for the long-haul experimental setup shown in FIG. 9B. FIG. 9E is a graph showing MOS scores comparison for the present disclosure with WebRTC for a typical Teleoperation scenario for long haul experimental shown in FIG. 9B for streaming via Relay servers located in Mumbai, Tokyo, Ohio, in accordance with some embodiments of the present disclosure. The MOS results gave additional consideration for ease of operation by only looking at the video feed from Kolkata. This was followed by making a comparative study between the average scene-to-screen latency figures of the present disclosure and WebRTC. To measure the scene to screen latency time synchronizing the two smart phones was done with milliseconds clock in Bangalore and Kolkata. The view of the clock was streamed from Kolkata. In Bangalore the mobile clock was set by the console and reception was recorded showing the time in both the screen and on the clock. FIG. 9F shows a setup for a latency measurement, in accordance with some embodiments of the present disclosure.

Figure 9G:
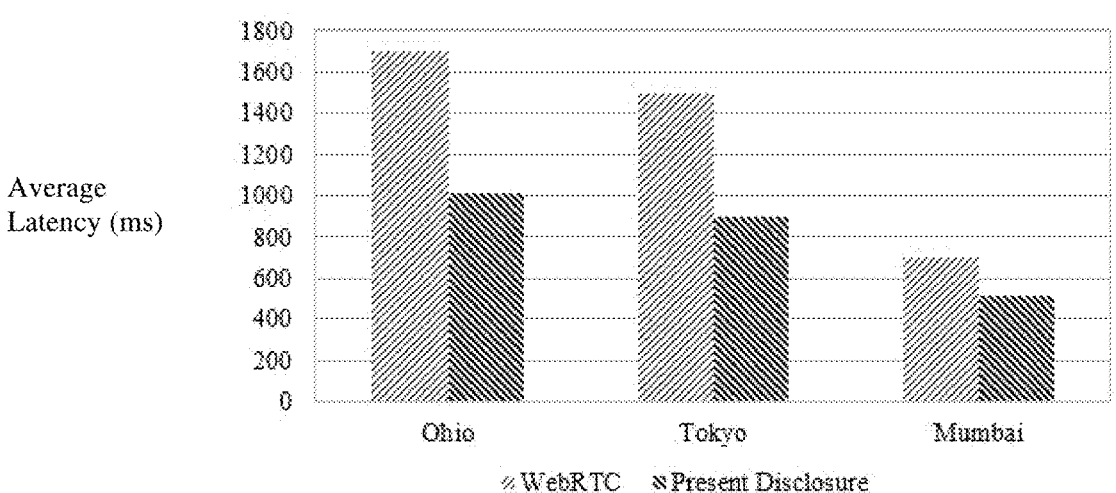
FIG. 9G is a graph showing a latency comparison of present disclosure with WebRTC for experimental setup in FIG. 9B for streaming via Relay servers in Ohio, Tokyo, and Mumbai, in accordance with some embodiments of the present disclosure.

FIG. 9G is a graph showing a latency comparison of present disclosure with WebRTC for experimental setup in FIG. 9F for streaming via Relay servers in Ohio, Tokyo, and Mumbai, in accordance with some embodiments of the present disclosure. The avg latency was observed in three different routes over the span of the experiment. As expected, it was found larger latency variation in Ohio, followed by Tokyo and then Mumbai. Mumbai was the least as both peers were in India. Ohio was the farthest. Though there were problems in synchronized operation due to the inherent photonic delay in the network, but regular freezing made the operation quite unrealizable in case of WebRTC. Several cycles of Ball throwing exercise were missed at Bangalore due to video freeze. This observation was very frequent for Ohio-routed traffic as WebRTC was unable to adapt with the latency variation leading to frequent freezes. At times the quality of the reception also extremely deteriorated leading to inability to do any kind of teleoperation. But such problems were much less in case of the present disclosure. The quality degradation happened quite gracefully. Also, since the present disclosure does not perform any chroma subsampling so originality of the scene colour was also preserved. There was momentary reduction in reception rate during overshooting of end-to-end latency, but it could conceal loss of packets due to latency variation to the satisfaction of the users. Also, like the previous experiment, in this case also the present disclosure performance improved almost in tandem with the recovery of the network, but for WebRTC it took quite long time to recover from on-screen freezing despite recovery of the network.

Along with upholding the end-user QoE, the present disclosure is also bandwidth efficient. FIG. 9D is a graph showing a comparative bandwidth consumption at Tx & Rx for live streaming via relay servers at Mumbai, Ohio & Tokyo, in accordance with some embodiments of the present disclosure. Intriguingly, bandwidth consumption consistently reduces from Mumbai-routed traffic to Ohio-routed traffic. The reason was the transmitter reduces the transmission rate in sync with degrading channel conditions. For Mumbai, the degradation is the least of the three. This observation was made both for WebRTC and the present disclosure. But it was seen that the present disclosure performs much better than WebRTC in bandwidth consumption in cases of routing via Mumbai and Tokyo. But for Ohio sequence, WebRTC consumes extremely low bandwidth as it pauses transmission for several seconds leading to long freezes in the streamed video deteriorating end-user experience. Hence only in case of routing via Ohio, WebRTC consumed less bandwidth than the present disclosure at the expense of the quality of streamed video. Whereas the BW consumed at Rx to send feedback(s) to Tx increases in reverse order with Mumbai being the least and Ohio being the highest. Even then, the present disclosure was shown to utilize much lesser channel bandwidth than WebRTC.

Next, the present disclosure was modified to support both fixed as well as dynamic foveated rendering. For fixed foveated rendering, the center of foveal region was set as the center of current video frames for the entire video stream, rest of the mechanisms remain the same as dynamic foveated rendering in present disclosure. The performance comparison was done between fixed and dynamic foveal region under long haul experimental setup for streaming via AWS instance hosted in Ohio following the architecture described earlier. The experiment was done only for Ohio as that route exhibited the most dynamic variations therefore the end-user QoE improvement attainable by dynamic foveated rendering over fixed foveated rendering will be more pronounced.

Figure 9H:
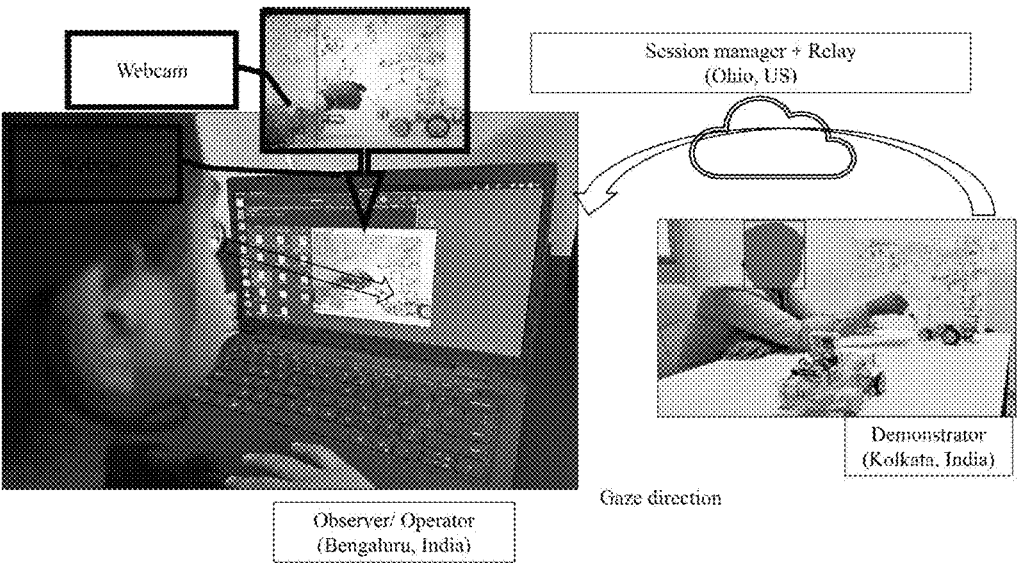
FIG. 9H shows a setup for live experiment with the dynamic foveation, in accordance with some embodiments of the present disclosure.
Figure 9I:
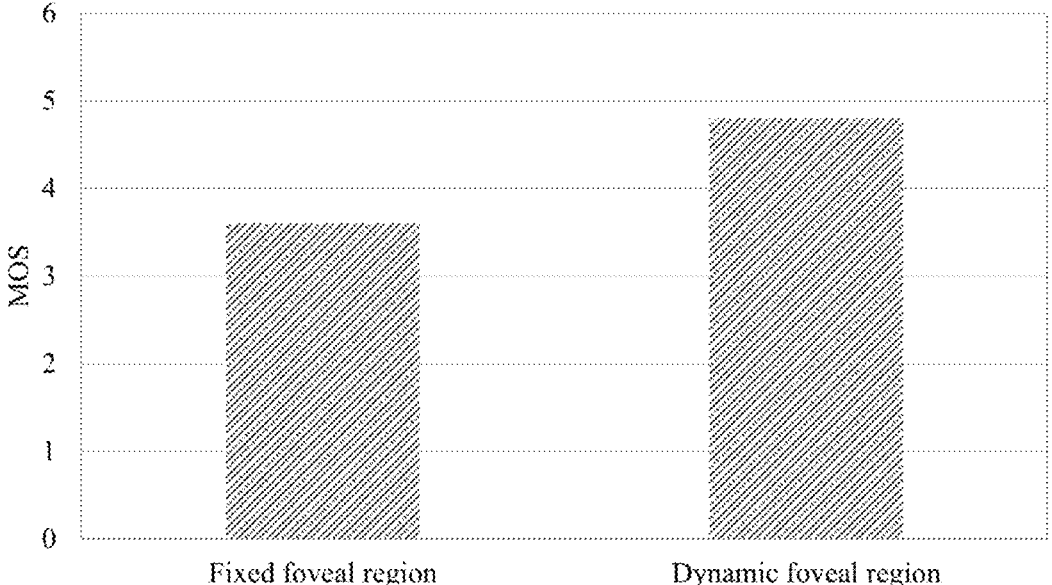
FIG. 9I is a graph showing a comparative result of MOS scores of fixed and dynamic foveated rendering, in accordance with some embodiments of the present disclosure.

FIG. 9I is a graph showing a comparative result of MOS scores of fixed and dynamic foveated rendering, in accordance with some embodiments of the present disclosure. The experimental setup for the same is illustrated in FIG. 9H. The demonstrator was demonstrating a plan on a board. The robo-car camera was streaming those visuals. The observer was supposed to gaze at that part of the board in the video feed where the demonstrator was pointing to. The demonstrator is in Kolkata. The visuals on that part should be of better quality to maintain legibility for the observer despite channel degradation. The Operator's camera was also switched on so that the GazOB module was able to track the gaze of the operator. Note that the operator-side camera in this case does not stream video. However, even if needed to transmit the video of the operator on the reverse path, GazOB does not latch on the camera and both gaze detection and video streaming can be done simultaneously. Whereas, for fixed foveated rendering, no eye-gaze tracking through operator's camera using GazeOB was performed. Hence foveal region was not dynamically shifted based on operator's eye-gaze. The performance was evaluated using subjective measures involving 20 users. For each user, first the experiment was performed with fixed foveated rendering for 5 minutes, followed by same streaming with GazOB turned on without changing anything. The users were to rate their QoE for both scenarios on a scale of 1 to 5 (with 1 being the lowest and 5 being the highest). The average MOS in shows that the present disclosure with GazOB improves the end-user experience.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

The embodiments of the present disclosure herein address the unresolved problem of synergizing context of the end-user with quality-of-experience of live video feed. An end-to-end system is implemented by the present disclosure for QoE-centric efficient live streaming mechanism where the transmission logic has an implicit consideration for end-user context. The present disclosure shows how intelligent frame-by-frame encoding mechanism tightly coupled with a suitable intelligent application protocol semantics can provide much better performance in real-life interactive applications like telerobotics.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g., any kind of computer like a server or a personal computer, or the like, or any combination thereof. The device may also include means which could be e.g., hardware means like e.g., an application-specific integrated circuit (ASIC), a field-programmable gate array (FPGA), or a combination of hardware and software means, e.g., an ASIC and an FPGA, or at least one microprocessor and at least one memory with software processing components located therein. Thus, the means can include both hardware means, and software means. The method embodiments described herein could be implemented in hardware and software. The device may also include software means. Alternatively, the embodiments may be implemented on different hardware devices, e.g., using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor-implemented method, comprising:

defining for a current video frame of a live video stream transmitted by a transmitter using an acquisition device, via one or more hardware processors, (i) a foveal region as a circle with a dynamically determined radius and a dynamically determined center, and (ii) a peripheral region as a region of a frame surrounding the foveal region;

receiving at the transmitter, via the one or more hardware processors, (i) an instantaneous feedback of a video quality, and (ii) 2-dimensional (2-D) eye-gaze coordinates of an end-user from a receiver, on a periodic timer expiry;

employing, via the one or more hardware processors, a dynamic foveated rendering for rendering the one or more successive video frames of the live video stream, at the transmitter, by dynamically adapting the center of the foveal region based on the 2-D eye-gaze coordinates of the end-user;

performing at the transmitter, via the one or more hardware processors, a foveation-centric spatial compression for both basic as well as Delta encoded frames, based on the dynamically determined radius and the center of the foveal region;

packetizing, via the one or more hardware processors, the one or more encoded successive video frames of the live video stream, into one or more packets, using a packetization technique; and transmitting, via the one or more hardware processors, the one or more packets, to the receiver, over the network communication channel at a predefined frame rate based on a chosen encoding scheme determined based on instantaneous value of an error estimates contained in the instantaneous feedback.

2. The processor-implemented method of claim 1, further comprising:

receiving, via the one or more hardware processors, the one or more packets, at the receiver;

reconstructing, via the one or more hardware processors, the one or more frames from the one or more packets, using the payload specific header; and estimating, via the one or more hardware processors, an error rate of the current video frame, using the payload specific header and a number of packets received.

3. The processor-implemented method of claim 1, wherein the dynamic foveated rendering is employed for rendering the one or more successive video frames of the live video stream, by:

instantaneously retrieving the 2-D eye-gaze coordinates of the end-user with respect to entire receiver side screen, using an online eye-tracking module on a periodic basis;

transforming the 2-D eye-gaze coordinates to corresponding co-ordinates with respect to a viewing canvas window;

invalidating the 2-D eye-gaze co-ordinates if that go beyond the viewing canvas window and computing various error estimates for the current video frame based on error incurred for current and past video frames; and transmitting (i) the computed error estimates of the current video frame as the instantaneous feedback of the video quality along with (ii) the 2-D eye-gaze co-ordinates, on the periodic timer expiry.

4. The processor-implemented method of claim 1, wherein:

the center is dynamically determined based on the 2-D eye gaze coordinates of the end-user at the receiver, and the radius is dynamically determined based on the instantaneous feedback of the video quality received on the periodic timer expiry.

5. A system, comprising:

a memory storing instructions;

one or more input/output (I/O) interfaces;

an acquisition device; and one or more hardware processors coupled to the memory via the one or more I/O interfaces, wherein the one or more hardware processors are configured by the instructions to:

define for a current video frame of a live video stream transmitted by a transmitter using an acquisition device, (i) a foveal region as a circle with a dynamically determined radius and a dynamically determined center, and (ii) a peripheral region as a region of a frame surrounding the foveal region;

receive at the transmitter, (i) an instantaneous feedback of a video quality, and (ii) 2-dimensional (2-D) eye-gaze coordinates of an end-user from a receiver, on a periodic timer expiry;

employ a dynamic foveated rendering for rendering the one or more successive video frames of the live video stream, at the transmitter, by dynamically adapting the center of the foveal region based on the 2-D eye-gaze coordinates of the end-user;

perform at the transmitter, a foveation-centric spatial compression for both basic as well as Delta encoded frames, based on the dynamically determined radius and the center of the foveal region;

packetize the one or more encoded successive video frames of the live video stream, into one or more packets, using a packetization technique; and transmit the one or more packets, to the receiver, over the network communication channel at a predefined frame rate based on a chosen encoding scheme determined based on instantaneous value of an error estimates contained in the instantaneous feedback.

6. The system of claim 5, wherein the one or more hardware processors are further configured by the instructions to:

receive the one or more packets, at the receiver;

reconstruct the one or more frames from the one or more packets, using the payload specific header; and estimate an error rate of the current video frame, using the payload specific header and a number of packets received.

7. The system of claim 5, wherein the one or more hardware processors are configured by the instructions to employ the dynamic foveated rendering for rendering the one or more successive video frames of the live video stream, by:

instantaneously retrieving the 2-D eye-gaze coordinates of the end-user with respect to entire receiver side screen, using an online eye-tracking module on a periodic basis;

transforming the 2-D eye-gaze coordinates to corresponding co-ordinates with respect to a viewing canvas window;

invalidating the 2-D eye-gaze co-ordinates if that go beyond the viewing canvas window and computing various error estimates for the current video frame based on error incurred for current and past video frames; and transmitting (i) the computed error estimates of the current video frame as the instantaneous feedback of the video quality along with (ii) the 2-D eye-gaze co-ordinates, on the periodic timer expiry.

8. The system of claim 5, wherein the one or more hardware processors are configured by the instructions to dynamically determine:

the center based on the 2-D eye gaze coordinates of the end-user, and the radius based on the instantaneous feedback of the video quality received on the periodic timer expiry.

9. One or more non-transitory machine-readable information storage mediums comprising one or more instructions which when executed by one or more hardware processors cause:

defining for a current video frame of a live video stream transmitted by a transmitter using an acquisition device, (i) a foveal region as a circle with a dynamically determined radius and a dynamically determined center, and (ii) a peripheral region as a region of a frame surrounding the foveal region;

receiving at the transmitter, (i) an instantaneous feedback of a video quality, and (ii) 2-dimensional eye-gaze coordinates of an end-user from a receiver, on a periodic timer expiry;

employing a dynamic foveated rendering for rendering the one or more successive video frames of the live video stream, at the transmitter, by dynamically adapting the center of the foveal region based on the 2-D eye-gaze coordinates of the end-user;

performing at the transmitter, a foveation-centric spatial compression for both basic as well as Delta encoded frames, based on the dynamically determined radius and the center of the foveal region;

packetizing the one or more encoded successive video frames of the live video stream, into one or more packets, using a packetization technique; and transmitting the one or more packets, to the receiver, over the network communication channel at a predefined frame rate based on a chosen encoding scheme determined based on instantaneous value of an error estimates contained in the instantaneous feedback.

10. The one or more non-transitory machine-readable information storage mediums of claim 9, wherein the one or more instructions which when executed by the one or more hardware processors cause:

receiving the one or more packets, at the receiver;

reconstructing the one or more frames from the one or more packets, using the payload specific header; and estimating an error rate of the current video frame, using the payload specific header and a number of packets received.

11. The one or more non-transitory machine-readable information storage mediums of claim 9, wherein the dynamic foveated rendering is employed for rendering the one or more successive video frames of the live video stream, by:

instantaneously retrieving the 2-D eye-gaze coordinates of the end-user with respect to entire receiver side screen, using an online eye-tracking module on a periodic basis;

transforming the 2-D eye-gaze coordinates to corresponding co-ordinates with respect to a viewing canvas window;

invalidating the 2-D eye-gaze co-ordinates if that go beyond the viewing canvas window and computing various error estimates for the current video frame based on error incurred for current and past video frames; and transmitting (i) the computed error estimates of the current video frame as the instantaneous feedback of the video quality along with (ii) the 2-D eye-gaze co-ordinates, on the periodic timer expiry.

12. The one or more non-transitory machine-readable information storage mediums of claim 9, wherein:

the center is dynamically determined based on the 2-D eye gaze coordinates of the end-user at the receiver, and the radius is dynamically determined based on the instantaneous feedback of the video quality received on the periodic timer expiry.

* * * * *